(12) United States Patent (10) Patent No.: US 12,671,783 B2
Niu (45) Date of Patent: Jun. 30, 2026

(54) VIDEO DATA TRANSITION PROCESSING METHOD AND ELECTRONIC DEVICE

(71) Applicant: Honor Device Co., Ltd., Shenzhen (CN)

(72) Inventor: Siyue Niu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 234 days.

(21) Appl. No.: 18/257,018

(22) PCT Filed: May 24, 2022

(86) PCT No.: PCT/CN2022/094793
§ 371 (c)(1),
(2) Date: Jun. 12, 2023

(87) PCT Pub. No.: WO2022/262537
PCT Pub. Date: Dec. 22, 2022

(65) Prior Publication Data
US 2024/0106967 A1 Mar. 28, 2024

(30) Foreign Application Priority Data

Jun. 16, 2021 (CN) .......................... 202110676709.3
Nov. 29, 2021 (CN) .......................... 202111439351.9
Jan. 18, 2022 (CN) .......................... 202210056943.0

(51) Int. Cl.
*H04N 5/262* (2006.01)
(52) U.S. Cl.
CPC .................................. *H04N 5/262* (2013.01)

(58) Field of Classification Search
CPC .............. H04N 5/262; H04N 21/8456; H04N 21/44016; H04N 23/62; H04N 23/631;
(Continued)

(56) References Cited

U.S. PATENT DOCUMENTS 10,200,634 B2 2/2019 Ouyang et al.
11,765,463 B2 9/2023 Li et al.
(Continued)

FOREIGN PATENT DOCUMENTS

CN 104184960 A 12/2014
CN 105227862 A 1/2016
(Continued)

OTHER PUBLICATIONS

Video editing method and electronic equipment (Year: 2020).*
Video processing method and device (Year: 2020).*

*Primary Examiner* — Twyler L Haskins
*Assistant Examiner* — Surafel Yilmakassaye
(74) *Attorney, Agent, or Firm* — Slater Matsil, LLP

(57) ABSTRACT

A method includes: displaying a first interface, where the first interface includes a first thumbnail of first video data, and the first video data includes a first transition special effect, and the first transition special effect is superimposed on a plurality of consecutive first video frames in the first video data; receiving a first operation performed by a user on the first thumbnail; displaying a second interface in response to the first operation, where the second interface includes a one-click blockbuster control; displaying a third interface after a second operation performed by the user on the one-click blockbuster control is received, where the third interface is used to display second video data.

20 Claims, 33 Drawing Sheets

(58) Field of Classification Search
      CPC .... H04N 23/667; H04N 5/915; G11B 27/031;
                 G11B 27/036; G11B 27/34; G06T 3/4038
      See application file for complete search history.

(56)                      References Cited

U.S. PATENT DOCUMENTS

| | | | |
|---|---|---|---|
| 2012/0148216 A1* | 6/2012 | Pavagada | H04N 5/772 |
| | | | 386/278 |
| 2014/0267842 A1 | 9/2014 | Lee et al. | |
| 2016/0073090 A1* | 3/2016 | Love | H04N 23/45 |
| | | | 348/48 |
| 2016/0205302 A1* | 7/2016 | Desai | H04N 23/631 |
| | | | 348/262 |
| 2017/0332020 A1 | 11/2017 | Ouyang et al. | |
| 2018/0176481 A1 | 6/2018 | Lokhande | |
| 2022/0382443 A1* | 12/2022 | Clarke | G06F 3/0482 |

FOREIGN PATENT DOCUMENTS

| | | | | | |
|---|---|---|---|---|---|
| CN | 107888988 A | | 4/2018 | | |
| CN | 110650376 A | | 1/2020 | | |
| CN | 110784735 A | | 2/2020 | | |
| CN | 111835986 A | | 10/2020 | | |
| CN | 111866404 A | * | 10/2020 | | H04N 23/63 |
| CN | 111866585 A | * | 10/2020 | | H04N 21/44 |
| JP | 2006279968 A | | 10/2006 | | |
| JP | 2015219817 A | | 12/2015 | | |
| WO | 2016124095 A1 | | 8/2016 | | |
| WO | 2020186969 A1 | | 9/2020 | | |

* cited by examiner

Electronic device 100

205

206

207

208

209

302

Front/Rear   Rear/Rear   Pictu   ar   Front
in-pictu (Detect an indication for enabling another camera)

(Determine that the enabled camera normally uploads a video stream)

803

VIDEO DATA TRANSITION PROCESSING METHOD AND ELECTRONIC DEVICE

CROSS-REFERENCE TO RELATED APPLICATIONS

This application is a national stage of International Application No. PCT/CN2022/094793 filed on May 24, 2022, which claims priorities to Chinese Patent Application No. 202110676709.3 filed on Jun. 16, 2021, Chinese Patent Application No. 202111439351.9 filed on Nov. 29, 2021, and Chinese Patent Application No. 202210056943.0 filed on Jan. 18, 2022. All of the aforementioned applications are hereby incorporated by reference in their entireties.

TECHNICAL FIELD

This application relates to the field of terminal technologies, and in particular, to a video data transition processing method and an electronic device.

BACKGROUND

With development of electronic technologies, electronic devices such as a mobile phone and a tablet computer are generally provided with a plurality of cameras, such as a front-facing camera, a rear-facing camera, and a wide-angle camera. The plurality of cameras help a user shoot a video work by using the electronic device.

After the user completes shooting of the video by using the electronic device, the video may be edited by adding a special effect, configuring music, or the like, to obtain a video work with higher watchability. Currently, in a process of manually editing the video by the user, there is still a problem of low human-computer interaction efficiency.

SUMMARY

Embodiments of this application provide a video data transition processing method and an electronic device, so as to improve human-computer interaction efficiency of video editing.

To achieve the foregoing objective, the following technical solutions are used in this application:

According to a first aspect, an embodiment of this application provides a video data transition processing method, where the method is applied to an electronic device, and the method includes: The electronic device displays a first interface, where the first interface includes a first thumbnail of first video data, the first video data includes a first transition special effect, and the first transition special effect is superimposed on a plurality of consecutive first video frames in the first video data; the electronic device receives a first operation performed by a user on the first thumbnail; the electronic device displays a second interface in response to the first operation, where the second interface is a video editing interface of the first video data, and the second interface includes a one-click blockbuster control; and the electronic device displays a third interface after receiving a second operation performed by the user on the one-click blockbuster control, where the third interface is used to display second video data, the second video data includes a video frame, a plurality of replacement frames, first music, and a second transition special effect corresponding to the first music that are of the first video data, the second transition special effect is superimposed on the plurality of replacement frames, and the replacement frame is used to replace the first video frame in the first video data.

In the foregoing embodiment, for saved video data, for example, the first video data, the electronic device may automatically edit and process the first video data in response to an operation performed by the user on the one-click blockbuster control, to obtain the second video data. The first music is configured in the second video data. When there is originally a transition special effect, for example, the first transition special effect, in the first video data, the electronic device may replace the first transition special effect with the second transition special effect matching the first music. In this way, the transition special effect that appears in the second video data can match the first music, thereby improving an adaptation degree between music and content in the second video data, improving user satisfaction with the second video data, and reducing a possibility of rework. In addition, the entire operation of triggering creation of the second video data is simple, thereby effectively improving human-computer interaction efficiency of video data creation.

In some possible embodiments, before that the electronic device displays a first interface, the method further includes: The electronic device displays a fourth interface, where the fourth interface is a viewfinder preview interface provided by a camera application, and the fourth interface includes a first control indicating to enable video shooting; the electronic device receives a third operation performed by the user on the first control; the electronic device displays a fifth interface in response to the third operation, and starts recording the first video data, where the fifth interface is a video recording interface in a first lens mode, and the fifth interface includes a second control indicating to switch a lens mode; when recording reaches a first time point of the first video data, the electronic device displays a sixth interface in response to a fourth operation performed by the user on the second control, and determines a video frame corresponding to the first time point as the first video frame, where the sixth interface is a video recording interface in a second lens mode, and the sixth interface includes a third control indicating to stop shooting; the electronic device receives a fifth operation performed by the user on the third control; and that the electronic device displays a first interface includes: The electronic device displays the first interface in response to the fifth operation, where the first interface is also a viewfinder preview interface provided by the camera application.

In the foregoing embodiment, the first video data may be a video shot by the electronic device in a conventional mode. In a process of shooting the video, when receiving, at the first time point, the operation of indicating to switch the lens mode, the electronic device may not only directly switch the lens mode, but also determine the video frame corresponding to the first time point in the first video data as the first video frame. In this way, when the first video data is edited and processed, a video frame affected by lens switching can be processed, to improve watchability of the second video data and improve human-computer interaction efficiency of video editing.

In some possible embodiments, after that the electronic device receives a fifth operation performed by the user on the third control, the method further includes: The electronic device superimposes the first transition special effect on the first video frame.

In the foregoing embodiment, the first transition special effect is added at a first time point of the first video data, and video clips collected before and after lens mode switching are connected by using the first transition special effect, thereby alleviating a discontinuity problem of video content caused by lens mode switching and improving filming quality.

In some possible embodiments, before that the electronic device displays a first interface, the method further includes: The electronic device displays a main interface, where the main interface includes an icon of a gallery application; and the electronic device receives a sixth operation performed by the user on the icon of the gallery application; and that the electronic device displays a first interface includes: The electronic device displays the first interface in response to the sixth operation, where the first interface is an application interface provided by the gallery application.

In the foregoing embodiment, the first video data may alternatively be video data stored in a gallery, that is, may be a video shot by another device, or may be a video obtained after primary creation. In this way, the user can process various video materials by using the electronic device, and an operation required for the processing is simple, thereby improving human-computer interaction efficiency of video creation.

In some possible embodiments, before that the electronic device displays a third interface, the method further includes: The electronic device determines a first effect template from a plurality of pre-configured effect templates in response to the second operation, where the first effect template includes the first music; the electronic device deletes the first video frame in the first video data; the electronic device freezes a second video frame in the first video data to obtain the replacement frame for replacing the first video frame, where the second video frame is an adjacent previous video frame of the first video frame or an adjacent subsequent video frame of the first video frame; and the electronic device superimposes the second transition special effect on the replacement frame.

In some possible embodiments, the first effect template corresponds to a first style; and the determining a first effect template from a plurality of pre-configured effect templates includes: The electronic device determines, by using a pre-configured artificial intelligence model, that the first video data matches the first style; and the electronic device determines the first effect template from an effect template that belongs to the first style; or the electronic device randomly determines the first photographing template from the plurality of pre-configured effect templates.

In some possible embodiments, before that the electronic device displays a third interface, the method further includes: The electronic device determines the second transition special effect corresponding to the first music.

In some possible embodiments, that the electronic device determines the second transition special effect corresponding to the first music includes: The electronic device determines, from a plurality of pre-configured transition special effects, the second transition special effect that has an association identifier with the first music.

In the foregoing embodiment, there is an absolute association between the second transition special effect and the first music. In this way, it is ensured that the second transition special effect in the second video data is adapted to the first music, thereby improving watchability of the second video data.

In some possible embodiments, that the electronic device determines the second transition special effect corresponding to the first music includes: The electronic device determines the second transition special effect from a plurality of pre-configured transition special effects based on matching weights, where each of the pre-configured transition special effects corresponds to one of the matching weights, and the matching weight is a quantization ratio parameter of an adaptation degree between the first music and the pre-configured transition special effect.

In the foregoing embodiment, there is a relative association between the second transition special effect and the first music, and further a type is random. In this way, it is ensured that the transition special effect is adapted to the first music, diversity of the transition special effect is also increased, thereby improving watchability of the second video data.

In some possible embodiments, the second video data further includes a third transition special effect, the third transition special effect is added to a video frame corresponding to a second time point in the first video data, the third transition special effect is one of a plurality of pre-configured transition special effects, and the plurality of pre-configured transition special effects include the second transition special effect.

According to a second aspect, an embodiment of this application provides an electronic device, where the electronic device includes one or more processors and a memory, the memory is coupled to the processor, the memory is configured to store computer program code, and the computer program code includes computer instructions. When the one or more processors execute the computer instructions, the one or more processors are configured to: display a first interface, where the first interface includes a first thumbnail of first video data, the first video data includes a first transition special effect, and the first transition special effect is superimposed on a plurality of consecutive first video frames in the first video data; receive a first operation performed by a user on the first thumbnail; display a second interface in response to the first operation, where the second interface is a video editing interface of the first video data, and the second interface includes a one-click blockbuster control; and display a third interface after a second operation performed by the user on the one-click blockbuster control is received, where the third interface is used to display second video data, the second video data includes a video frame, a plurality of replacement frames, first music, and a second transition special effect corresponding to the first music that are of the first video data, the second transition special effect is superimposed on the plurality of replacement frames, and the replacement frame is used to replace the first video frame in the first video data.

In some possible embodiments, before displaying the first interface, the one or more processors are further configured to: display a fourth interface, where the fourth interface is a viewfinder preview interface provided by a camera application, and the fourth interface includes a first control indicating to enable video shooting; receive a third operation performed by the user on the first control; display a fifth interface in response to the third operation, and start recording the first video data, where the fifth interface is a video recording interface in a first lens mode, and the fifth interface includes a second control indicating to switch a lens mode; when recording reaches a first time point of the first video data, display a sixth interface in response to a fourth operation performed by the user on the second control, and determine a video frame corresponding to the first time point as the first video frame, where the sixth interface is a video recording interface in a second lens mode, and the sixth interface includes a third control indicating to stop shooting; and receive a fifth operation performed by the user on the third control.

The one or more processors are further configured to display the first interface in response to the fifth operation, where the first interface is also a viewfinder preview interface provided by the camera application.

In some possible embodiments, after receiving the fifth operation performed by the user on the third control, the one or more processors are further configured to superimpose the first transition special effect on the first video frame.

In some possible embodiments, before displaying the first interface, the one or more processors are further configured to: display a main interface, where the main interface includes an icon of a gallery application; and receive a sixth operation performed by the user on the icon of the gallery application; and the displaying a first interface includes: The electronic device displays the first interface in response to the sixth operation, where the first interface is an application interface provided by the gallery application.

In some possible embodiments, before displaying the third interface, the one or more processors are further configured to: determine a first effect template from a plurality of pre-configured effect templates in response to the second operation, where the first effect template includes the first music; delete the first video frame in the first video data; freeze a second video frame in the first video data to obtain the replacement frame for replacing the first video frame, where the second video frame is an adjacent previous video frame of the first video frame or an adjacent subsequent video frame of the first video frame; and superimpose the second transition special effect on the replacement frame.

In some possible embodiments, the one or more processors are further configured to: determine, by using a pre-configured artificial intelligence model, that the first video data matches the first style; and determine the first effect template from an effect template that belongs to the first style; or randomly determine the first photographing template from the plurality of pre-configured effect templates.

In some possible embodiments, before displaying the third interface, the one or more processors are further configured to determine the second transition special effect corresponding to the first music.

In some possible embodiments, the one or more processors are further configured to determine, from a plurality of pre-configured transition special effects, the second transition special effect that has an association identifier with the first music.

In some possible embodiments, the one or more processors are further configured to determine the second transition special effect from a plurality of pre-configured transition special effects based on matching weights, where each of the pre-configured transition special effects corresponds to one of the matching weights, and the matching weight is a quantization ratio parameter of an adaptation degree between the first music and the pre-configured transition special effect.

In some possible embodiments, the second video data further includes a third transition special effect, the third transition special effect is added to a video frame corresponding to a second time point in the first video data, the third transition special effect is one of a plurality of pre-configured transition special effects, and the plurality of pre-configured transition special effects include the second transition special effect.

According to a third aspect, an embodiment of this application provides a computer storage medium, including computer instructions. When the computer instructions are run on an electronic device, the electronic device is enabled to perform the method according to the first aspect and the possible embodiments of the first aspect.

According to a fourth aspect, this application provides a computer program product. When the computer program product runs on the foregoing electronic device, the electronic device is enabled to perform the method according to the first aspect and the possible embodiments of the first aspect.

It may be understood that the electronic device, the computer storage medium, and the computer program product provided in the foregoing aspects are all applied to the foregoing corresponding method. Therefore, for beneficial effects that can be achieved by the electronic device, the computer storage medium, and the computer program product, references may be made to beneficial effects in the foregoing corresponding method. Details are not described herein again.

DETAILED DESCRIPTION OF ILLUSTRATIVE EMBODIMENTS

In the following, the terms "first" and "second" are used for descriptive purposes only, and cannot be construed as indicating or implying relative importance or implicitly indicating a quantity of technical features indicated. Therefore, the features defined with "first" and "second" may explicitly or implicitly include one or more of the features. In the description of embodiments, unless otherwise stated, "a plurality of" means two or more.

The following describes implementations of embodiments in detail with reference to the accompanying drawings.

An embodiment of this application provides a video data transition processing method, and the method may be applied to an electronic device having a plurality of cameras. According to the method provided in this embodiment of this application, an electronic device may respond to an operation of a user, and automatically process video data, for example, add a transition special effect and configure video music. When it is ensured that the transition special effect is added to match the video music, complexity of a video data editing operation is reduced, and human-computer interaction efficiency of video creation is improved.

For example, the electronic device in this embodiment of this application may be a mobile phone, a tablet computer, a smartwatch, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR)/virtual reality (virtual reality, VR) device, or the like that includes the plurality of cameras. A specific form of the electronic device is not specifically limited in this embodiment of this application.

Figure 1:
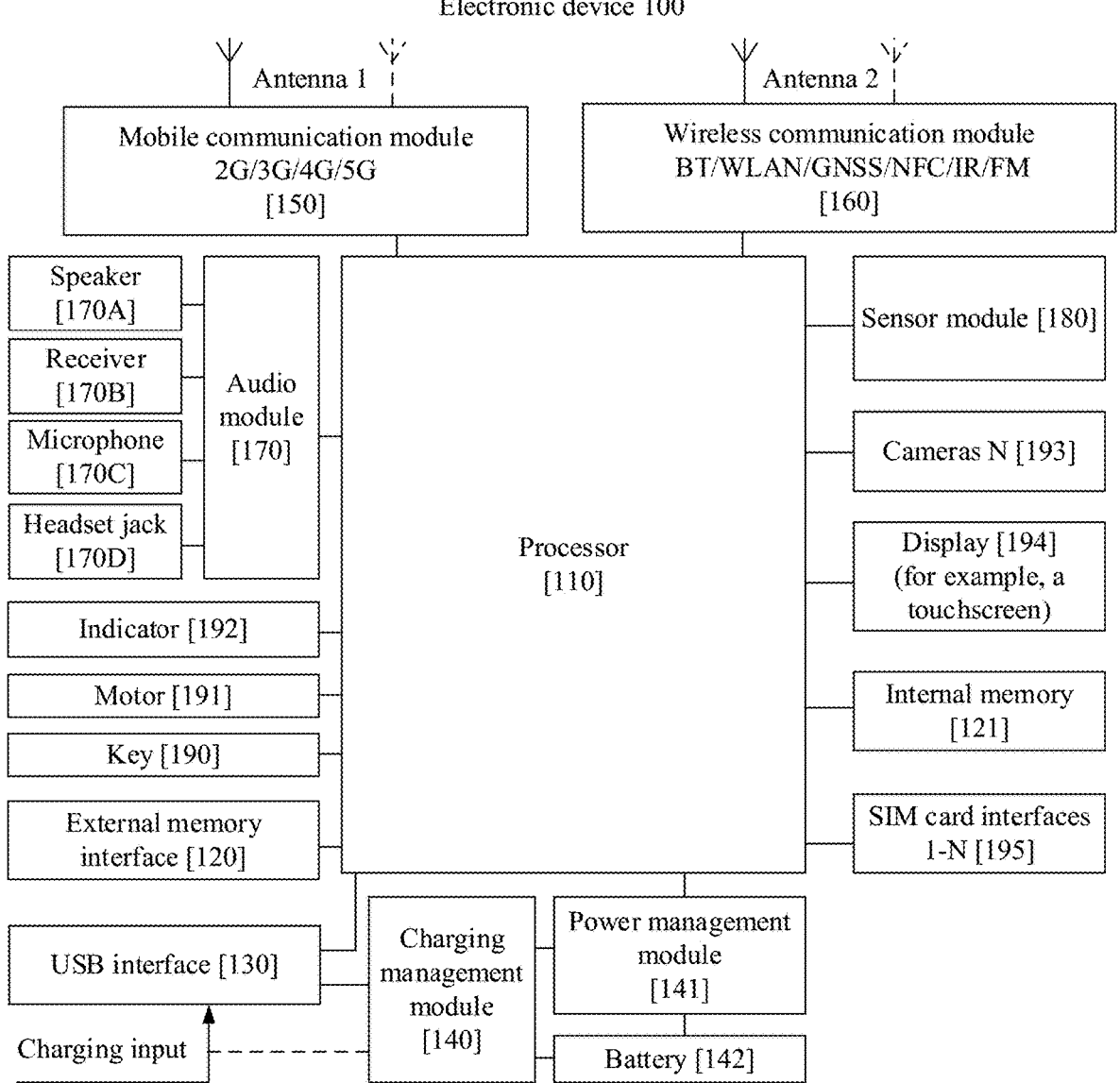
FIG. 1 is a schematic diagram of a structure of an electronic device according to an embodiment of this application.

The following describes implementations of embodiments of this application in detail with reference to the accompanying drawings. FIG. 1 is a schematic diagram of a structure of an electronic device 100 according to an embodiment of this application. As shown in FIG. 1, the electronic device 100 may include a processor no, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like.

The sensor module 180 may include a sensor such as a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

It may be understood that a structure shown in this embodiment does not constitute a specific limitation on the electronic device 100. In some other embodiments, the electronic device wo may include more or fewer components than those shown in the figure, or some components may be combined, or some components may be split, or a different component arrangement may be used. The components shown in the figure may be implemented in hardware, software, or a combination of software and hardware.

The processor no may include one or more processing units. For example, the processor no may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on instruction operation code and a timing signal, to complete control of instruction fetching and instruction execution.

The processor no may be further provided with a memory for storing instructions and data. In some embodiments, the memory in the processor no is a cache memory. The memory may store instructions or data just used or cyclically used by the processor 110. If the processor no needs to use the instructions or the data again, the instructions or the data may be directly invoked from the memory. Repeated access is avoided, and a waiting time of the processor no is reduced, thereby improving system efficiency.

In some embodiments, the processor no may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between modules illustrated in this embodiment is merely an illustrative description, and does not constitute a limitation on a structure of the electronic device 100. In some other embodiments, the electronic device 100 may alternatively use an interface connection mode different from that in the foregoing embodiment, or use a combination of a plurality of interface connection modes.

The electronic device 100 implements a display function through the GPU, the display 194, the application processor, and the like. The GPU is an image processing microprocessor and is connected to the display 194 and the application processor. The GPU is configured to perform mathematical and geometric calculation and render graphics. The processor no may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a Miniled, a MicroLed, a MicrooLed, quantum dot light emitting diodes (quantum dot light emitting diodes, QLED), or the like.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a camera photosensitive element through a lens, an optical signal is converted into an electrical signal, and the camera photosensitive element transfers the electrical signal to the ISP for processing, so that the electrical signal is converted into an image visible to a naked eye. The ISP can further optimize algorithms for noise, brightness, and a skin color of the image. The ISP can further optimize parameters such as exposure and color temperature in a photographing scene. In some embodiments, the ISP may be disposed on the camera 293.

The camera 193 is configured to capture a static image or a video. An optical image is generated for an object through the lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert into a digital image signal. The ISP outputs the digital image signal to the DSP for processing. The DSP converts the digital image signal into an image signal in a standard format such as RGB, YUV, and the like. In some embodiments, the electronic device 100 may include N cameras 193, where N is a positive integer greater than 1.

For example, the N cameras 193 may include one or more front-facing cameras and one or more rear-facing cameras. For example, the electronic device 100 is a mobile phone. The mobile phone includes at least one front-facing camera. The front-facing camera is disposed on a front side of the mobile phone, for example, a front-facing camera 201 shown in FIG. 2(A). In addition, the mobile phone includes at least one rear-facing camera. The rear-facing camera is disposed on a back side of the mobile phone. In this way, the front-facing camera and the rear-facing camera face different directions.

In some embodiments, the electronic device may enable at least one of the N cameras 139 to shoot, and generate a corresponding photo or video. For example, the front-facing camera of the electronic device 100 is separately used for photographing. For another example, the rear-facing camera of the electronic device 100 is separately used for photographing. For another example, two front-facing cameras are simultaneously enabled for photographing. For another example, two rear-facing cameras are simultaneously enabled for photographing. For another example, one front-facing camera and one rear-facing camera are simultaneously enabled for photographing.

It may be understood that separately enabling one camera 139 for photographing may be referred to as enabling a single-camera mode, for example, a front-camera mode (also referred to as a single-front mode) or a rear-camera mode (also referred to as a single-rear mode). Simultaneously enabling a plurality of cameras 139 for photographing may be collectively referred to as enabling a multi-camera mode, for example, a front/front mode, a front/rear mode, a rear/rear mode, and a picture-in-picture mode.

For example, one front-facing camera and one rear-facing camera are simultaneously enabled. After one front-facing camera and one rear-facing camera are simultaneously enabled for photographing, the electronic device may perform rendering and merging on image frames collected by the front-facing camera and the rear-facing camera. The rendering and merging may be splicing image frames collected by different cameras. For example, after portrait photographing is performed in the front/rear mode, the image frames collected by the different cameras may be spliced up and down. For another example, after landscape photographing is performed in the rear/rear mode, the image frames collected by the different cameras may be spliced left and right. For another example, after photographing is performed in the picture-in-picture mode, an image frame collected by one camera may be embedded in an image frame collected by another camera. Then, encoding is performed to generate a photo.

In addition, after one front-facing camera and one rear-facing camera are simultaneously enabled for video shooting, the front-facing camera collects one video stream and buffers the video stream, and the rear-facing camera collects one video stream and buffers the video stream. Then, the electronic device 100 performs rendering and merging processing on the buffered two video streams frame by frame, that is, performs rendering and merging on video frames whose collection time points are the same or matched in the two video streams. Then, encoding is performed to generate a video file.

The digital signal processor is configured to process digital signals, including not only digital image signals but also other digital signals. For example, when the electronic device 100 selects a frequency channel number, the digital signal processor is configured to perform Fourier transform or the like on energy at the frequency channel number.

The video codec is configured to compress or decompress a digital video. The electronic device 100 may support one or more types of video codecs. In this way, the electronic device 100 can play or record videos in a plurality of encoding formats, for example, moving picture experts group (moving picture experts group, MPEG)1, MPEG2, MPEG3, and MPEG4.

The NPU is a neural-network (neural-network, NN) computing processor that processes input information rapidly by referring to a structure of a biological neural network, for example, by referring to a transmission mode between human brain neurons, and can further perform self-learning continuously. Applications such as intelligent cognition of the electronic device 100, for example, image recognition, face recognition, speech recognition, and text understanding, can be implemented by using the NPU.

The audio module 170 is configured to convert digital audio information into an analog audio signal for outputting, and is also configured to convert an analog audio input into a digital audio signal. The audio module 170 may be further configured to encode and decode audio signals. In some embodiments, the audio module 170 may be disposed in the processor 110, or some of functional modules of the audio module 170 may be disposed in the processor 110. The speaker 170A, also referred to as a "horn", is configured to convert an audio electrical signal into a sound signal. In this way, the electronic device 100 can play audio data such as video music.

The pressure sensor is configured to sense a pressure signal, and may convert the pressure signal into an electrical signal. In some embodiments, the pressure sensor may be disposed on the display 194. The gyroscope sensor may be configured to determine a motion posture of the electronic device 100. When the electronic device 100 is static, a value and a direction of gravity may be detected. The gyroscope sensor may be further configured to identify a posture of the electronic device 100, and be used in applications such as switching between a landscape mode and a portrait mode. The touch sensor is also referred to as a "touch panel". The touch sensor may be disposed on the display 194. The touch sensor 180K and the display 194 form a touchscreen, which is also referred to as a "touch-controlled screen". The touch sensor is configured to detect a touch operation performed on or near the touch sensor. The touch sensor may transfer a detected touch operation to the application processor to determine a touch event type.

For clarity and brevity of description of the following embodiments, related concepts or technologies are briefly described first.

After the user shoots a video by using the electronic device, the shot video may be edited by operating the electronic device, for example, configuring video music, adding an animation special effect, and adding a transition special effect. In this way, a video obtained after secondary creation is more vivid and rich, and also conforms to a creation intention of the user. Adding the transition special effect can not only make transition of video content more natural, but also make content presented in the video richer.

However, in a related technology, in a case in which there is a transition special effect in a video, if the user manually changes an original transition special effect, an operation process is complex. If the user does not change the original transition special effect, the original transition special effect may not conform to a video music style selected by the user. Clearly, on a premise of ensuring video watchability, human-computer interaction efficiency of adding the transition special effect needs to be improved.

To resolve this problem, an embodiment of this application provides a video data transition processing method. In the following, an example in which the foregoing electronic device 100 is a mobile phone is used to describe the method in embodiments of this application.

Figure 2A:
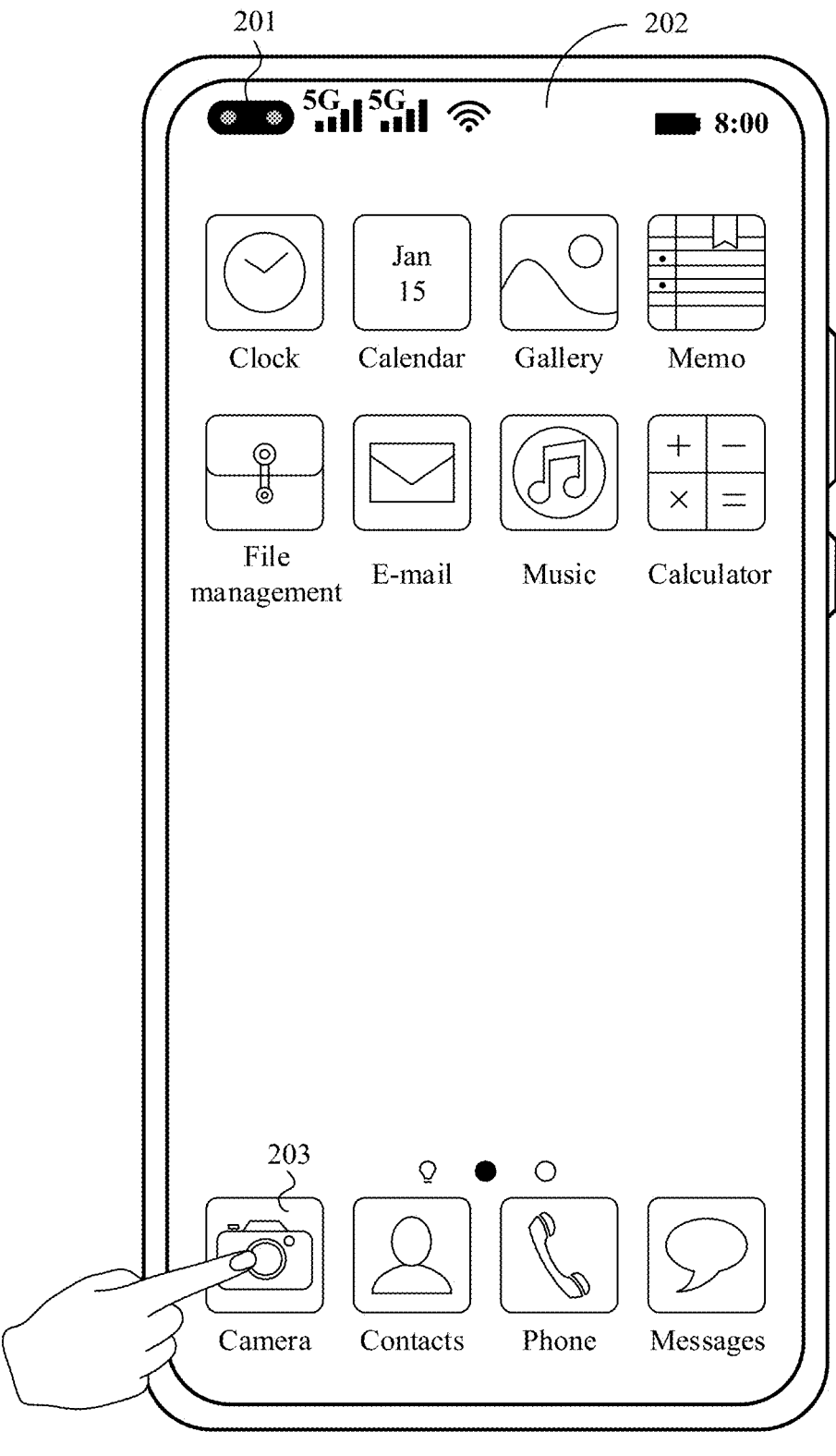
FIG. 2(A) to FIG. 2(D) are a first example diagram of a display interface according to an embodiment of this application.

As shown in FIG. 2(A), the mobile phone includes a main interface. The main interface is also referred to as a desktop 202. The main interface may be a user interface displayed after the mobile phone is unlocked. The main interface may include an icon of an installed application (Application, APP), for example, an icon 203 of a camera APP.

In some embodiments, the mobile phone may receive an operation performed by a user on the main interface, and start an APP indicated by the operation. For example, as shown in FIG. 2(A), the mobile phone may receive an operation, for example, a tap operation, performed by the user on the icon 203, and start the camera APP in response to the operation. After the camera APP is started, an application interface provided by the camera APP may be displayed. For example, a viewfinder interface, that is, an interface 204 shown in FIG. 2(B), used to execute a photographing function is displayed.

In some embodiments, the user may switch different function modes of the camera APP on the interface 204, such as a portrait function mode, a photographing function mode, a video recording function mode, and a multi-lens video recording function mode. That is, the mobile phone may receive an operation 1 of the user on the interface 204, and the operation 1 is used to indicate the camera APP to switch different function modes.

For example, the interface 204 includes controls corresponding to a plurality of function modes of the camera APP, such as a portrait control, a photographing control, a video recording control, and a multi-lens video recording control. The photographing control is in a selected state, and is used to prompt the user that a current viewfinder interface is used to perform a photographing function.

Figure 2B:
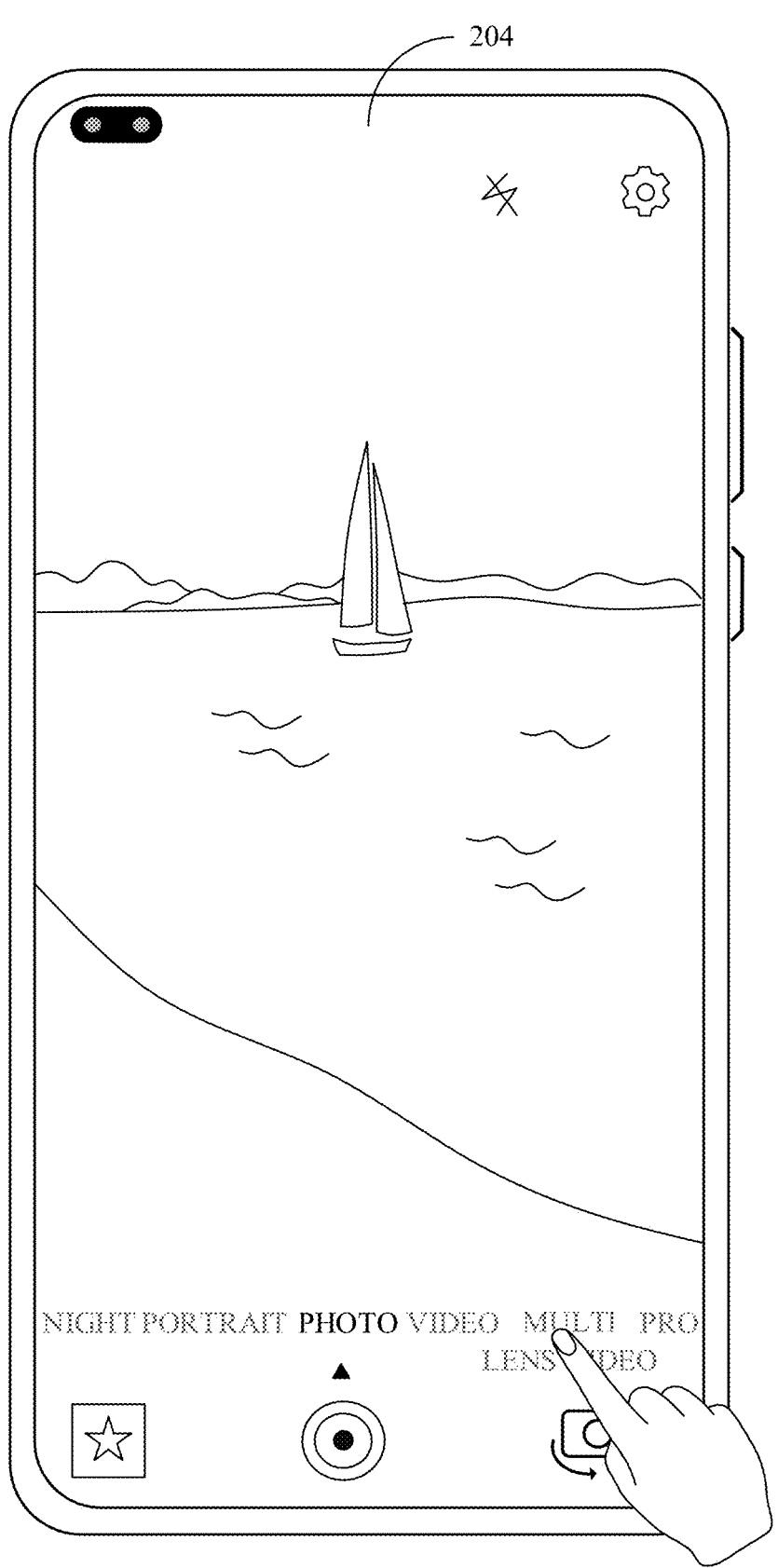

During displaying of the interface 204, the mobile phone may receive an operation performed by the user on any one of the portrait control, the video recording control, and the multi-lens video recording control, determine a switched-to function mode based on the operation, and display a viewfinder interface existing before the function mode is executed. For example, when receiving an operation, for example, a tap operation, performed by the user on the portrait control, the mobile phone may display a viewfinder interface existing before a portrait photographing function is performed. At the same time, the portrait control is in a selected state. When receiving an operation, for example, a tap operation, performed by the user on the video recording control, the mobile phone may display a viewfinder interface existing before a video recording function is performed. At the same time, the video recording control is in a selected state. In addition, as shown in FIG. 2(B), when receiving an operation, for example, a tap operation, performed by the user on the multi-lens video recording control, the mobile phone may display a viewfinder interface existing before the multi-lens video recording function is performed, that is, an interface 205 shown in FIG. 2(C). At the same time, the multi-lens video recording control is in a selected state. It may be understood that the interface 205 is an example of a fourth interface. In some other embodiments, a viewfinder interface existing before a conventional video recording function is performed may also be referred to as the fourth interface.

Both the video recording function and the multi-lens video recording function may be used to record video data. A difference between the video recording function and the multi-lens video recording function is that lens modes that are enabled when recording starts are different. Under the video recording function, the mobile phone may enable, in response to an operation of the user, a single-camera lens mode such as a single-front mode or a single-rear mode for video shooting. Under the multi-lens video recording function, the mobile phone may enable, in response to an operation of the user, a multi-camera lens mode such as a front/rear mode, a rear/rear mode, or a picture-in-picture mode for video shooting. The method provided in this embodiment of this application is not only applicable to video data captured under the video recording function, but also applicable to video data captured under the multi-lens video recording function, and implementation principles are the same. In a subsequent embodiment, the multi-lens video recording function is mainly used as an example to describe the method provided in this embodiment of this application.

Figure 2C:
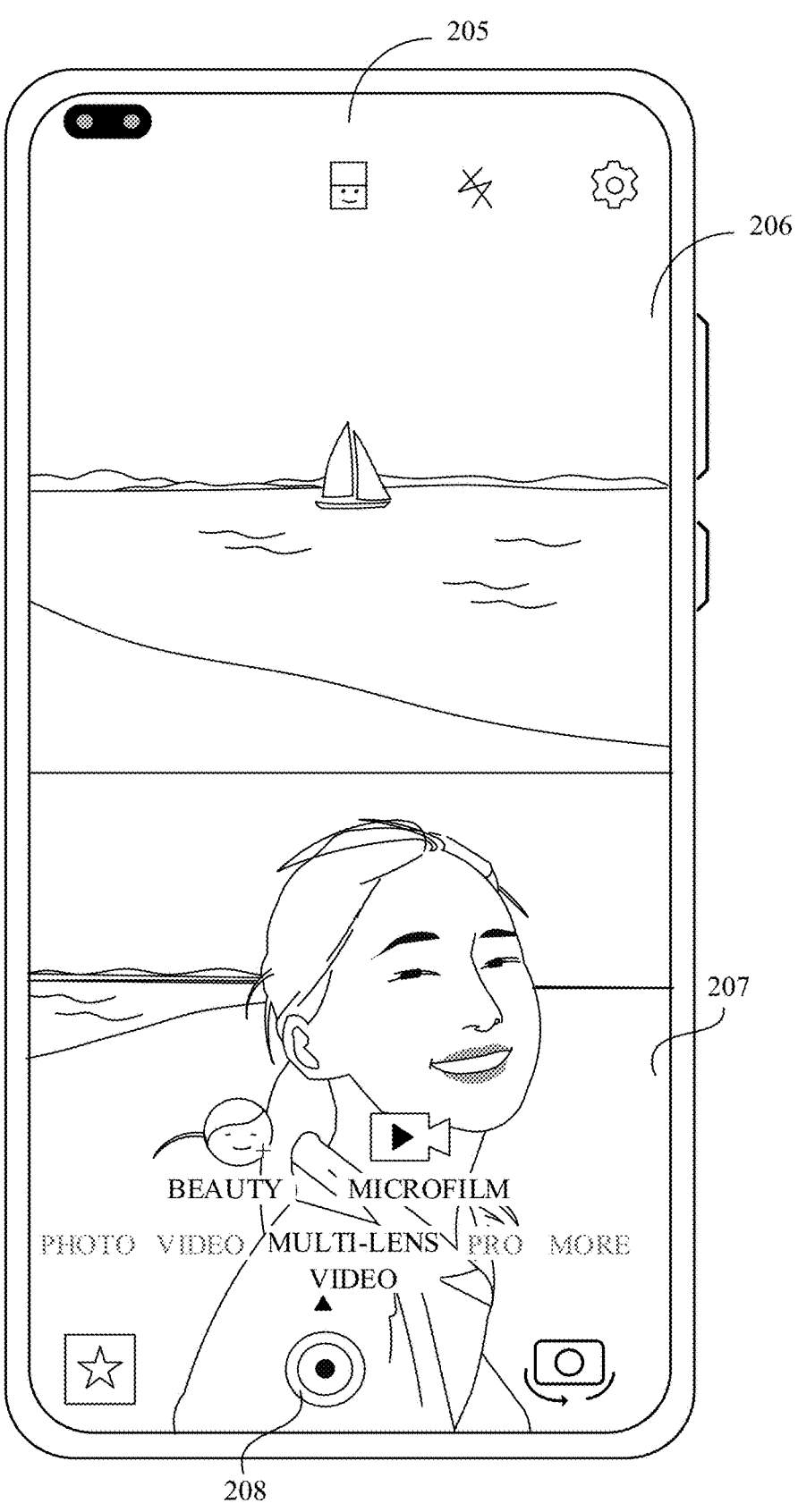

Before the multi-lens video recording function is performed, as shown in FIG. 2(C), a viewfinder interface (that is, the interface 205) displayed on the mobile phone includes a plurality of viewfinder frames, for example, a viewfinder frame 206 and a viewfinder frame 207. An arrangement location relationship between the viewfinder frame 206 and the viewfinder frame 207 is related to a posture of the mobile phone. For example, in a scenario in which a gyroscope sensor of the mobile phone identifies that the mobile phone is in a portrait state, the viewfinder frame 206 and the viewfinder frame 207 are arranged up and down. In a scenario in which the gyroscope sensor of the mobile phone identifies that the mobile phone is in a landscape state, the viewfinder frame 206 and viewfinder frame 207 are arranged left and right.

In addition, the viewfinder frame 206 and the viewfinder frame 207 respectively correspond to cameras. For example, the viewfinder frame 206 corresponds to a camera 1 (for example, a rear-facing camera a). In this way, the viewfinder frame 206 may be configured to display a video stream uploaded by the camera 1. The viewfinder frame 207 corresponds to a camera 2 (for example, a front-facing camera). In this way, the viewfinder frame 207 may be configured to display a video stream uploaded by the camera 2. It may be understood that a camera corresponding to each viewfinder frame (for example, the viewfinder frame 206 and the viewfinder frame 207) may be adjusted based on an operation of the user. After the camera corresponding to each viewfinder frame changes, a lens mode used by the mobile phone accordingly changes. Several scenarios of lens mode switching are described in a subsequent embodiment, and details are not described herein.

Figure 2D:
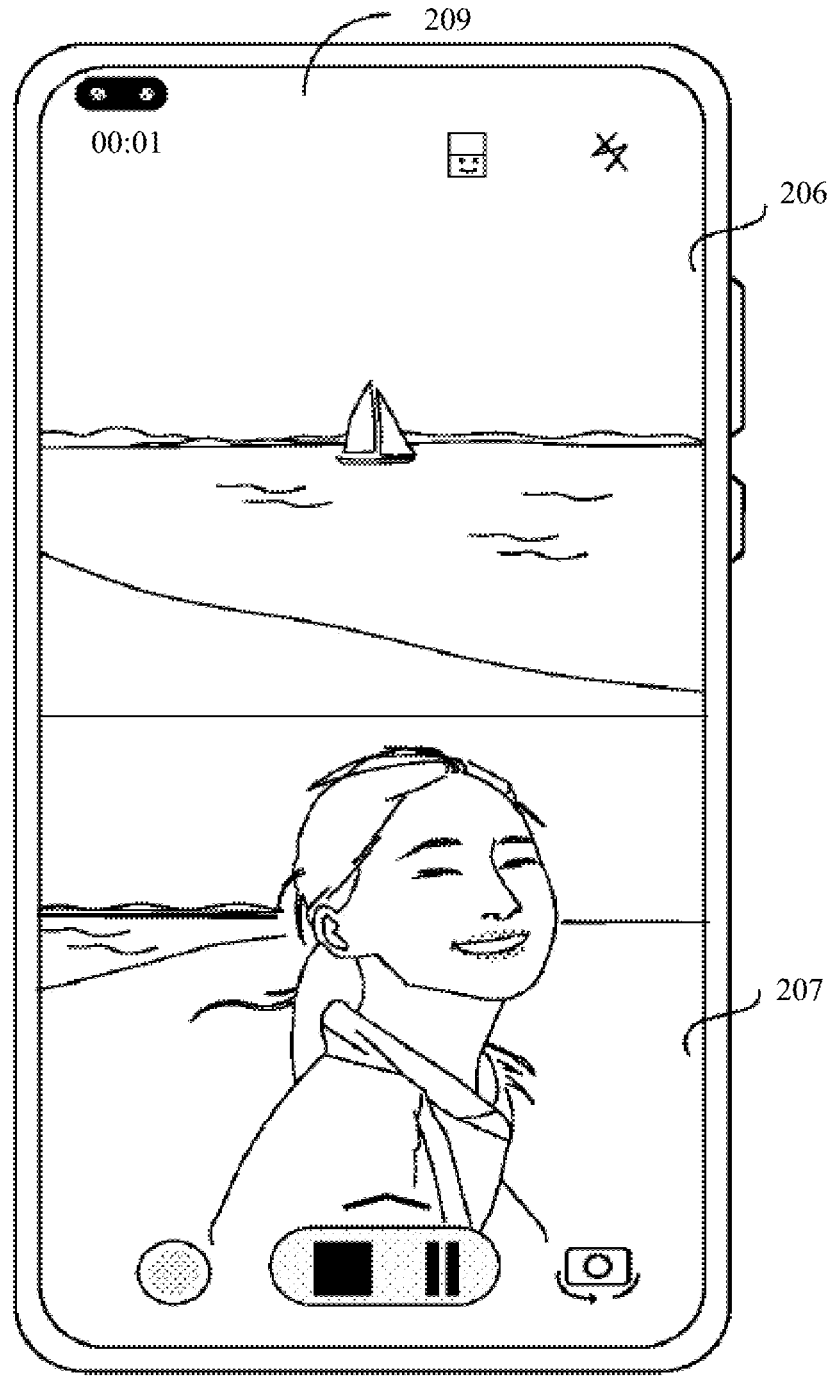

In addition, on the interface 205, the mobile phone may receive an operation 2 of the user, where the operation 2 is used to trigger the mobile phone to directly start video shooting without selecting any special effect. The operation 2 may also be referred to as a third operation. For example, the interface 205 includes a control 208 used to indicate to start photographing, that is, a first control. When receiving a third operation, for example, a tap operation, performed by the user on the control 208, the mobile phone may display a viewfinder interface of a video being recorded, for example, referred to as a fifth interface, for example, an interface 209 shown in FIG. 2(D). The interface 209 is a recording viewfinder interface in a first lens mode, for example, is a recording viewfinder interface corresponding to the front/rear mode.

The interface 209 also includes the viewfinder frame 206 and the viewfinder frame 207. In this way, the interface 209 of the mobile phone can display video streams collected in real time by the front-facing camera and the rear-facing camera a. In addition, the mobile phone can further perform rendering and merging on the video streams collected by the front-facing camera and the rear-facing camera a, then perform encoding, generate video data, and save the video data. In a photographing process, video frames of the video data gradually increase.

In addition, in a video shooting process, the mobile phone may receive an operation 3 of the user on the interface 209, and the operation 3 may be an operation for indicating to switch a lens mode. In response to the operation 3, the mobile phone may enable different cameras or different camera combinations to collect a video stream, so that the user creates a video with diverse scenes and rich content.

Figure 3A:
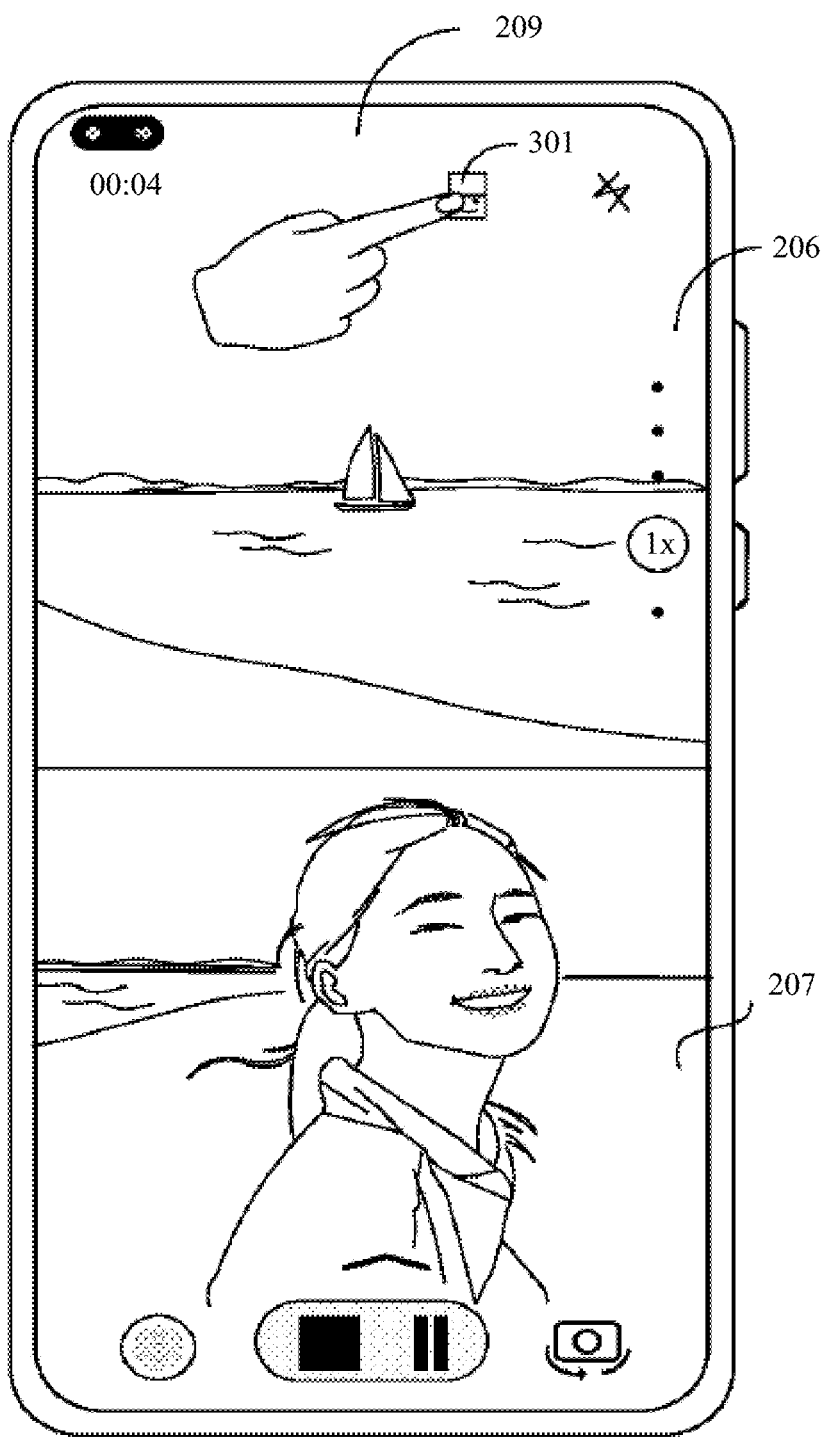
FIG. 3(A) to FIG. 3(D) are a second example diagram of a display interface according to an embodiment of this application.
Figure 3B:
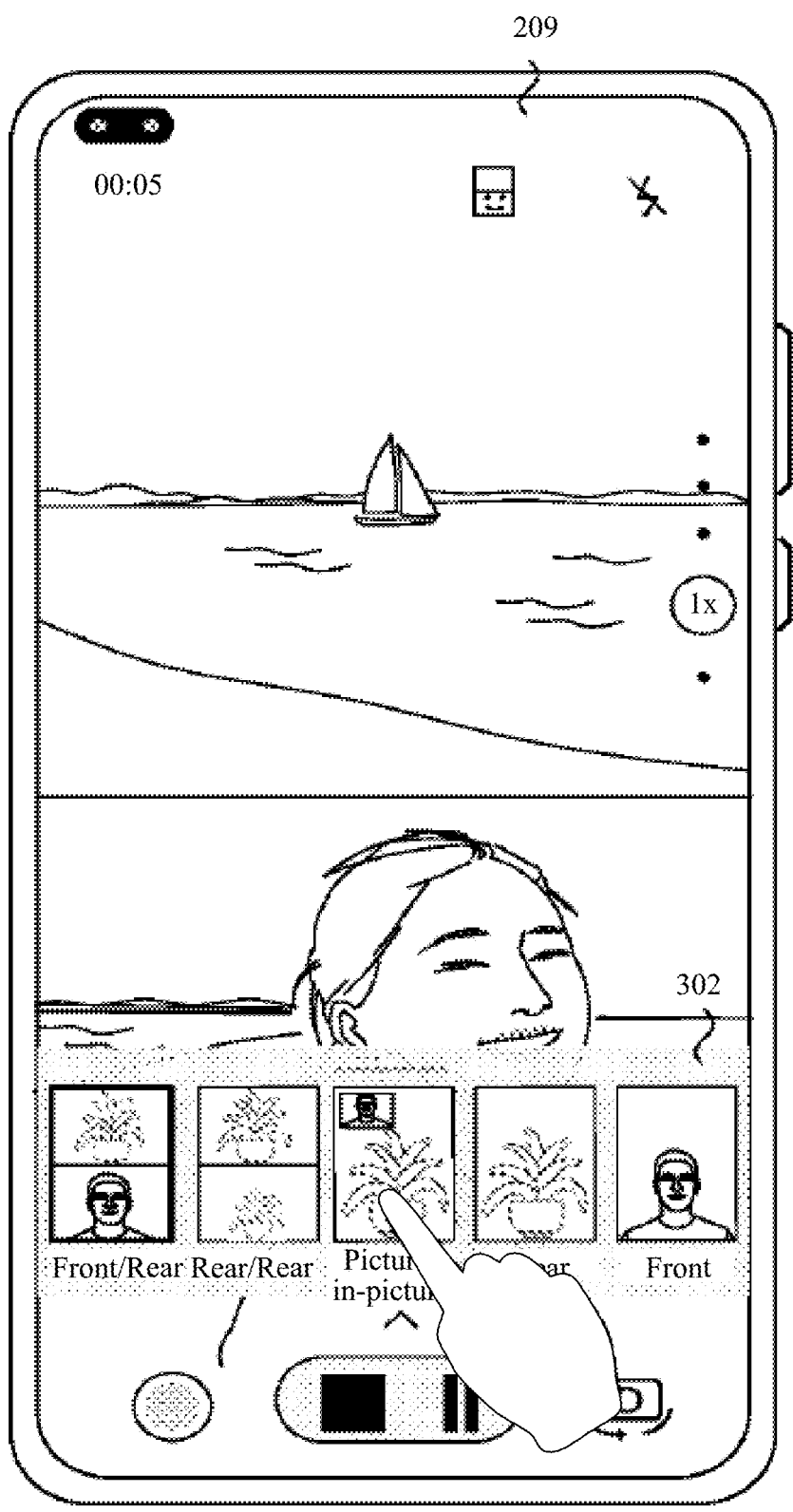

For example, the interface 209 may include a control used to indicate to switch a lens mode, which is also referred to as a second control, for example, a control 301 shown in FIG. 3(A). An icon of the control 301 is used to indicate a currently enabled lens mode. After receiving an operation performed by the user on the control 301, as shown in FIG. 3(B), the mobile phone may display, on the interface 209, a lens mode selection window, for example, a window 302. The window 302 lists a plurality of optional lens modes, such as the front/rear mode, the rear/rear mode, the picture-in-picture mode, the single-rear mode, and the single-rear mode. In the window 302, the front/rear mode is in a selected state. In this scenario, the mobile phone may receive a selection operation performed by the user on the rear/rear mode, the picture-in-picture mode, the single-rear mode, or the single-rear mode, and switch a used lens mode in response to the selection operation. The foregoing operation of implementing switching of the lens mode may be referred to as a fourth operation.

Figure 3C:
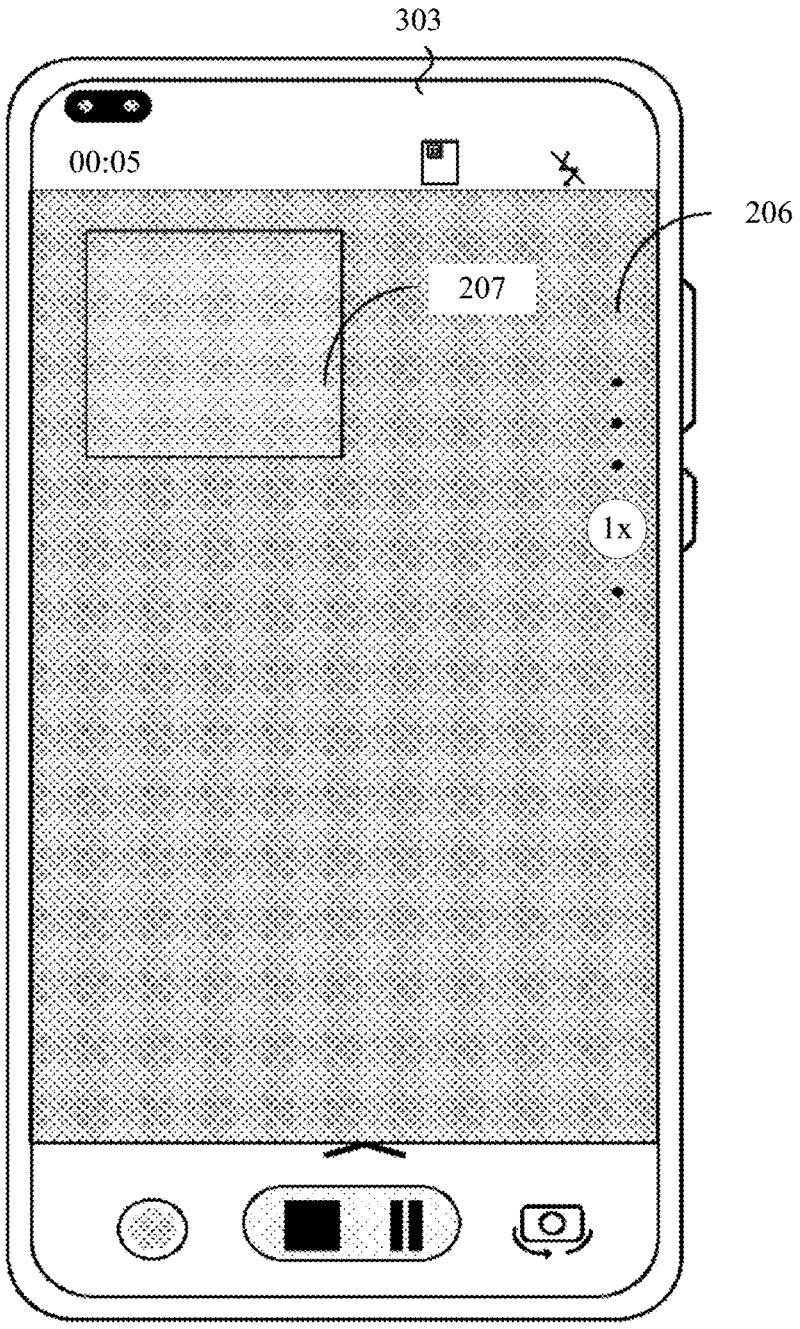

For example, when the mobile phone receives the selection operation performed by the user on the picture-in-picture mode, the mobile phone may switch the lens mode to the picture-in-picture mode. That is, as shown in FIG. 3(C), the mobile phone may switch to display an interface 303. The interface 303 is an example of a sixth interface. It may be understood that the sixth interface refers to a corresponding video recording interface after the lens mode (also referred to as a second lens mode) is switched. The interface 303 also includes the viewfinder frame 206 and the viewfinder frame 207. The viewfinder frame 206 is configured to continue to display a video stream uploaded by the rear-facing camera a, and the viewfinder frame 207 is configured to continue to display a video stream uploaded by the front-facing camera.

Figure 3D:
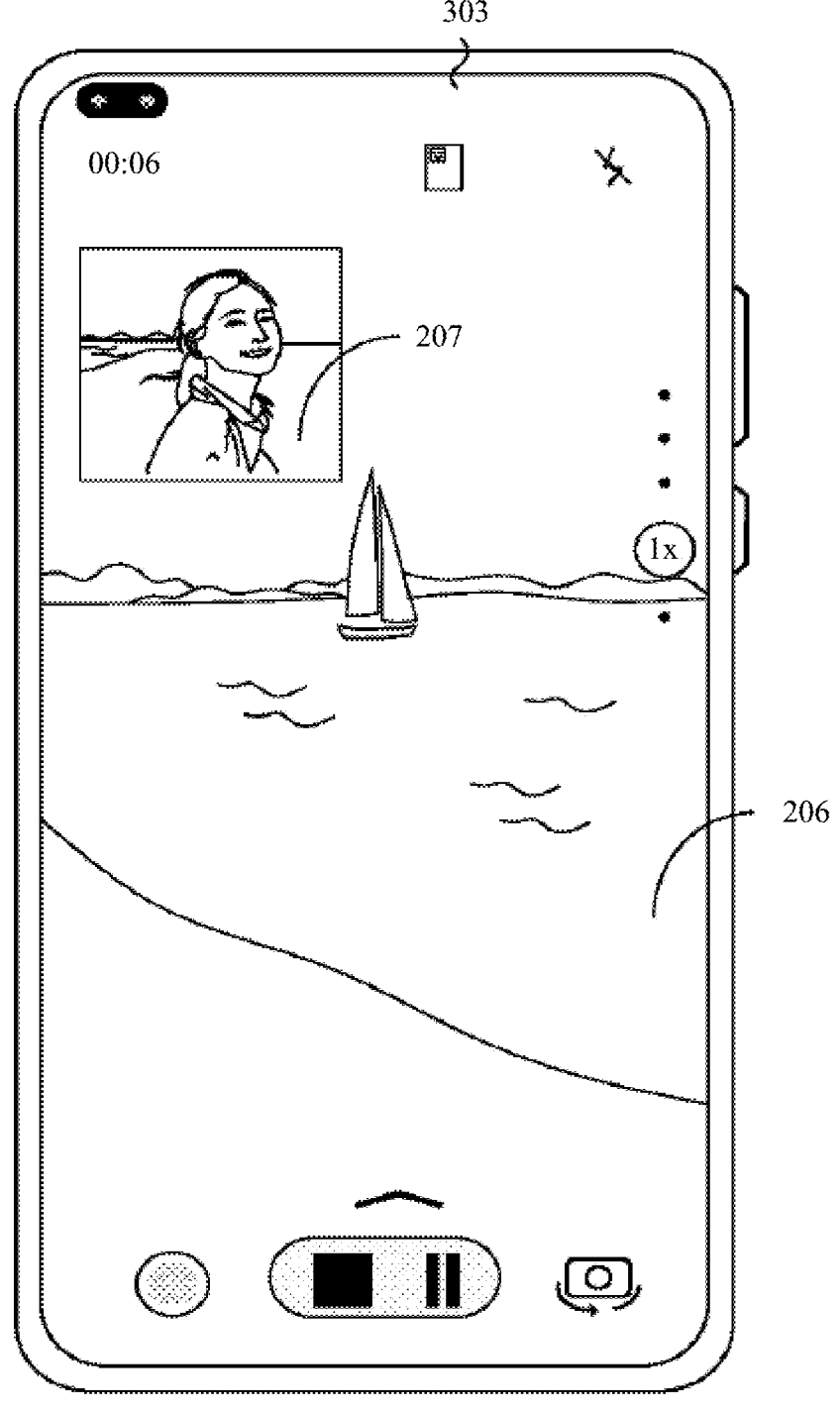

In addition, in a switching process, the viewfinder frame 207 zooms out. However, the viewfinder frame 206 increases. In addition, the viewfinder frame 207 is overlapped on the viewfinder frame 206. In this process, camera parameters of the front-facing camera and the rear-facing camera a are also adjusted. After the camera parameters are adjusted, video streams collected by the front-facing camera and the rear-facing camera a may not be uploaded in a timely manner. This causes a pause segment to appear in captured video data 1. That is, as shown in FIG. 3(C), blank screens appear in the viewfinder frame 206 and the viewfinder frame 207 of the interface 303 for a short time. Certainly, after camera parameter configuration is completed, as shown in FIG. 3(D), the viewfinder frame 207 of the interface 303 displays, in real time, the video stream uploaded by the front-facing camera, and the viewfinder frame 206 displays, in real time, the video stream uploaded by the rear-facing camera a.

Figure 4:
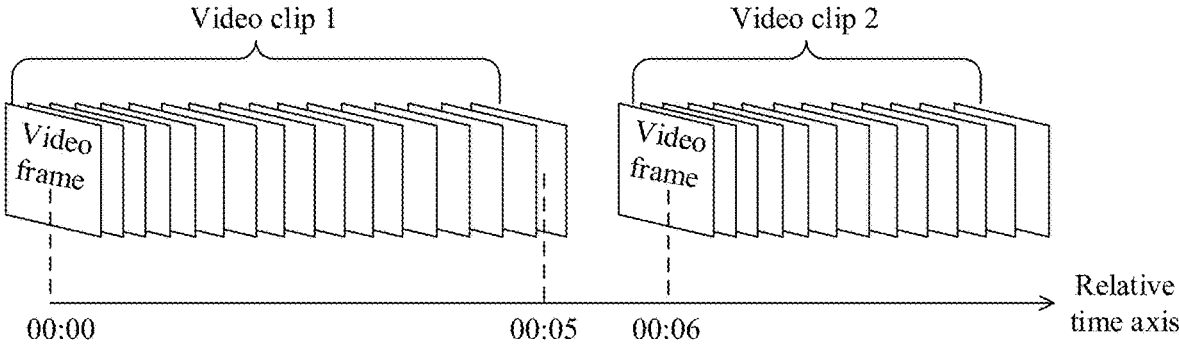
FIG. 4 is a conceptual example diagram of impact on video data 1 after a lens mode is switched from a front/rear mode to a picture-in-picture mode.

FIG. 4 conceptually shows impact of lens mode switching (switching from a front/rear mode to a picture-in-picture mode) on video data 1 in a process of shooting a video by a mobile phone. On a relative time axis of the video data 1, between a moment 00:00 and a moment 00:05, both the front-facing camera and the rear-facing camera a may normally upload the video streams. In addition, the mobile phone may normally perform encoding based on the video streams uploaded by the front-facing camera and the rear-facing camera a, and generate a plurality of consecutive video frames, which are also referred to as a video clip 1. The relative time axis is a time axis created based on the video data 1. The moment 00:00 of the relative time axis corresponds to a collection time of a first video frame (also referred to as a head frame) of the video data 1.

After the moment 00:05, the mobile phone detects an operation of indicating to switch to the picture-in-picture mode. The moment 00:05 is an example of a first time point. This operation may temporarily affect video stream backhauls of the front-facing camera and the rear-facing camera a. Consequently, a problem of missing a video frame occurs between the moment 00:05 and a moment 00:06. After the moment 00:06, the front-facing camera and the rear-facing camera a resume normal, so that collection and encoding can be performed to obtain consecutive video frames, which may also be referred to as a video clip 2.

Figure 5:
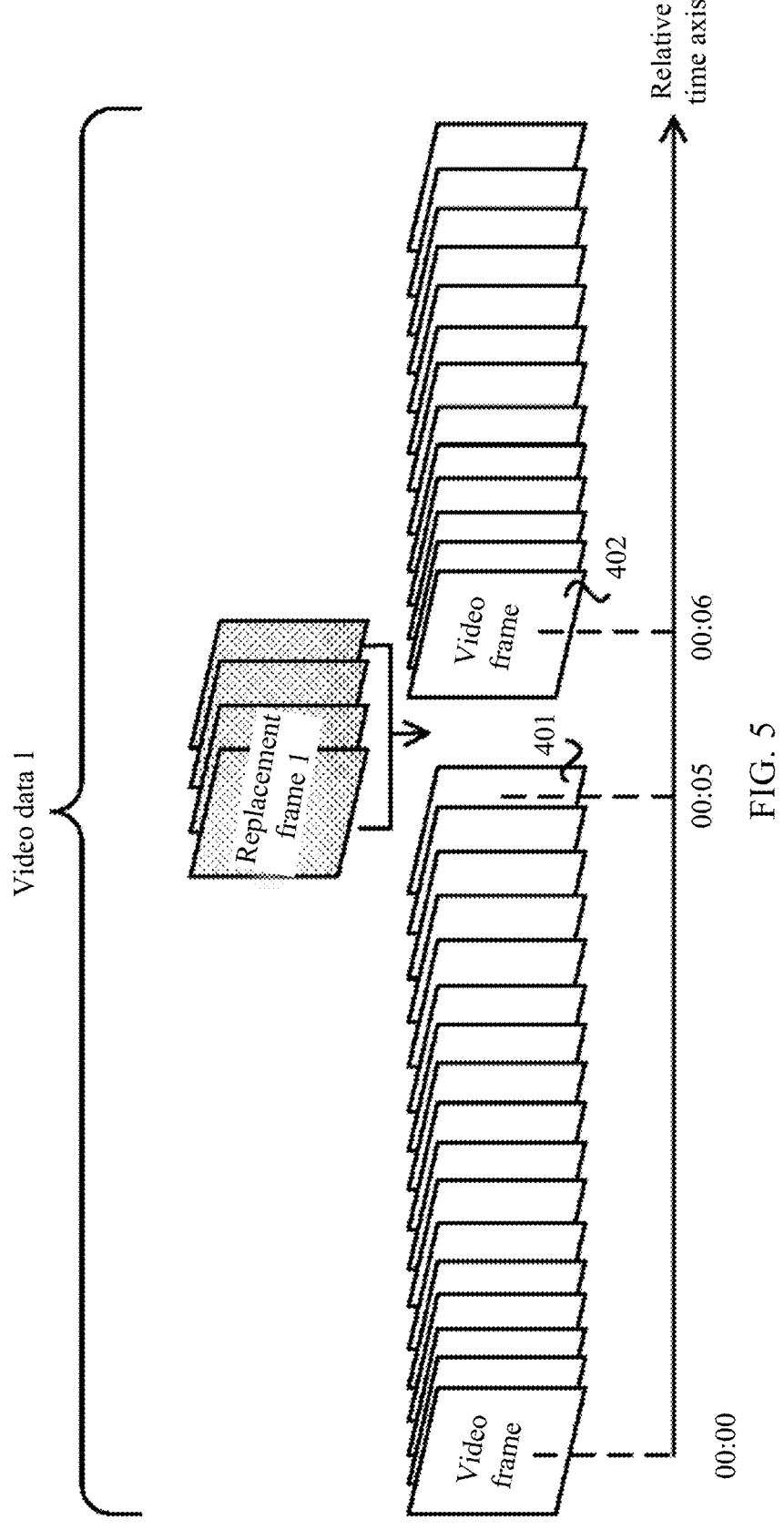
FIG. 5 is a conceptual example diagram of processing video data 1 after a lens mode is switched from a front/rear mode to a picture-in-picture mode.

In this embodiment of this application, as shown in FIG. 5, the mobile phone may insert a plurality of replacement frames 1 between the moment 00:05 and the moment 00:06, to obtain a continuous procedure of the video data 1. The replacement frame 1 inserted after the moment 00:05 (namely, the first time point) may also be referred to as a video frame corresponding to the first time point.

In some examples, after the mobile phone determines that the user indicates to switch to the picture-in-picture mode, the mobile phone may freeze a video frame 401 (the last frame in the video clip 1) to obtain the replacement frame 1. In this scenario, picture content displayed in the replacement frame 1 is the same as that displayed in the video frame 401. After receiving the video stream backhauled by each camera again, the mobile phone cancels frame freezing for the video frame 401.

In some other examples, after determining that the user indicates to switch to the picture-in-picture mode, the mobile phone may insert a pre-configured image frame, for example, a black image frame or a white image frame, after the video frame 401, and does not stop inserting the replacement frame 1 until the video stream backhauled by each camera is received again. It may be understood that inserted image frames may also be collectively referred to as the replacement frame 1.

In another example, after determining that the user indicates to switch to the picture-in-picture mode, the mobile phone may mark the video frame 401. In this way, after capture of the video data 1 is completed, the mobile phone automatically inserts the plurality of replacement frames 1 after the video frame 401. The replacement frame 1 may be an image frame same as the video frame 401, or may be the pre-configured white image frame or black image frame.

Figure 6A:
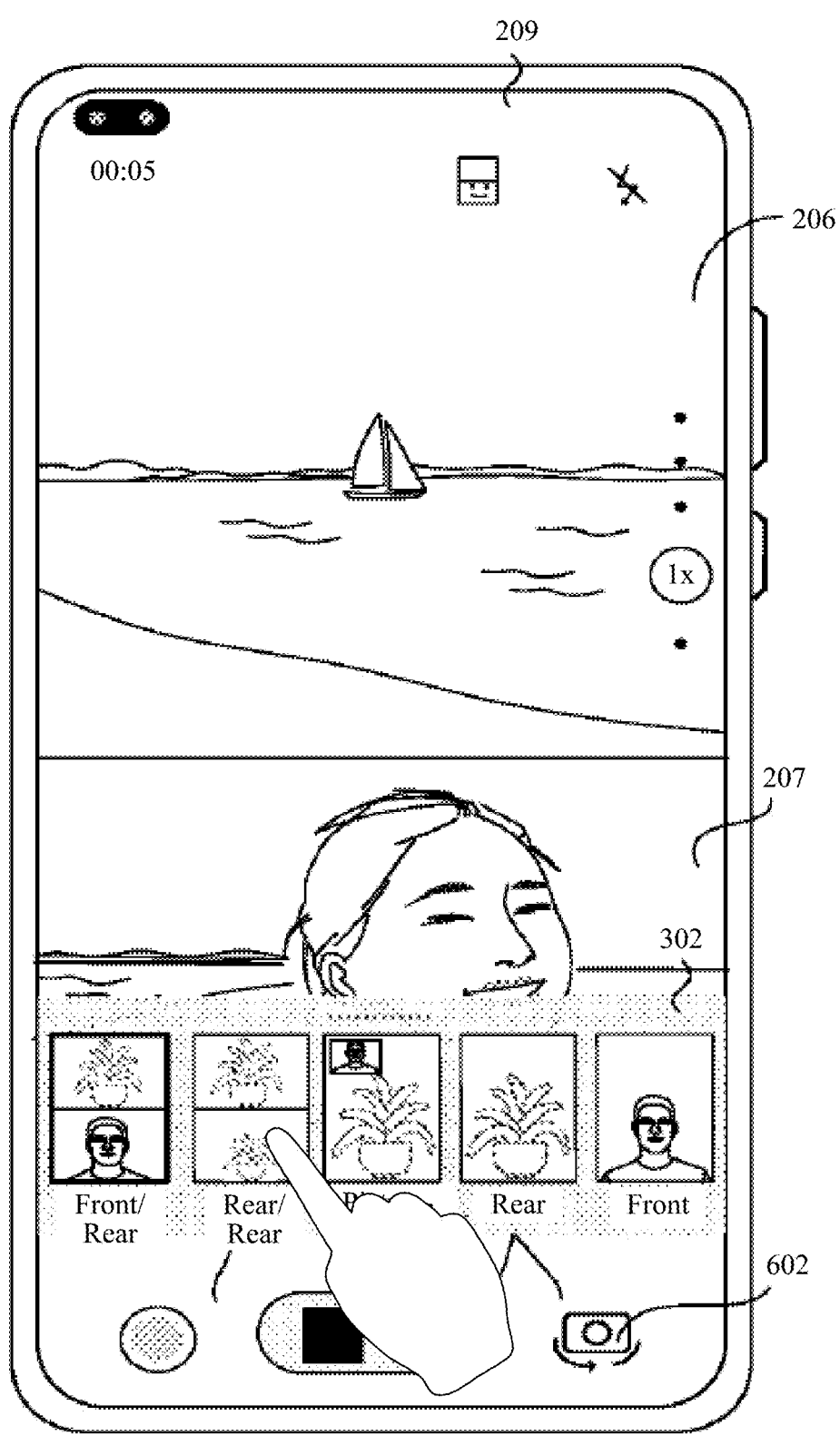
FIG. 6(A) to FIG. 6(C) are a third example diagram of a display interface according to an embodiment of this application.
Figure 6B:
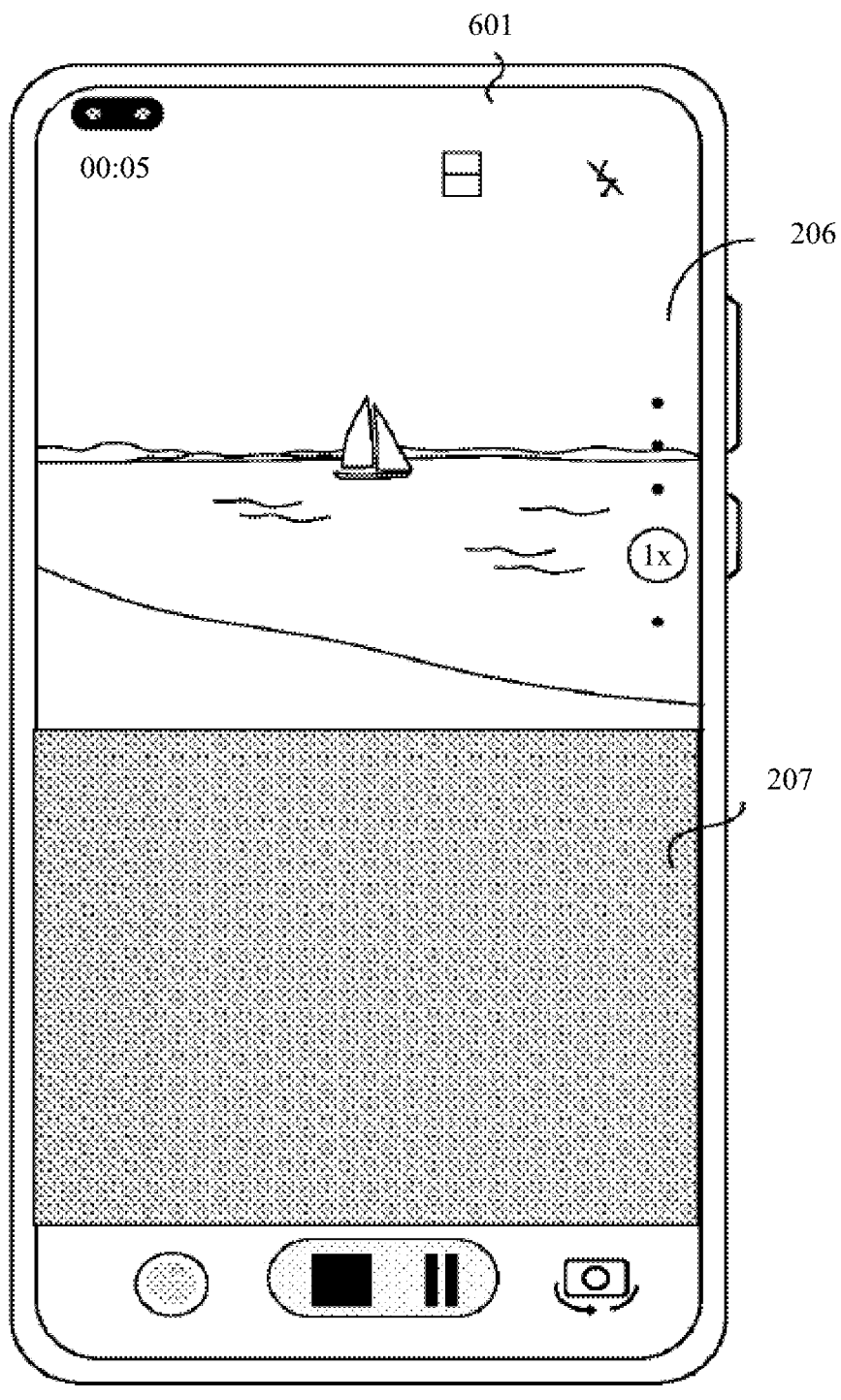

For another example, when the interface 209 includes the window 302, as shown in FIG. 6(A), the mobile phone may receive the selection operation performed by the user on the rear/rear mode. In this way, the mobile phone may switch the used lens mode to the rear/rear mode in response to the selection operation. That is, as shown in FIG. 6(B), the mobile phone may switch to display an interface 601. The interface 601 also includes the viewfinder frame 206 and the viewfinder frame 207. The viewfinder frame 206 is configured to display the video stream uploaded by the rear-facing camera a, and the viewfinder frame 207 is configured to display a video stream uploaded by a rear-facing camera b.

In addition to selecting the rear/rear mode from the window 302, during displaying of the interface 209, that is, during video shooting performed by the mobile phone in the front/rear mode, when receiving an operation, for example, a tap operation, performed by the user on a control 602, the mobile phone may also switch the lens mode to the rear/rear mode.

In a process of switching to the rear/rear mode, a relative location and a size between the viewfinder frame 206 and the viewfinder frame 207 remain unchanged, the mobile phone enables the rear-facing camera b, disables the front-facing camera, and makes the rear-facing camera b correspond to the viewfinder frame 207. In this way, the viewfinder frame 206 of the mobile phone continues to display the video stream uploaded by the rear-facing camera a, and the viewfinder frame 207 displays the video stream uploaded by the rear-facing camera b.

Figure 6C:
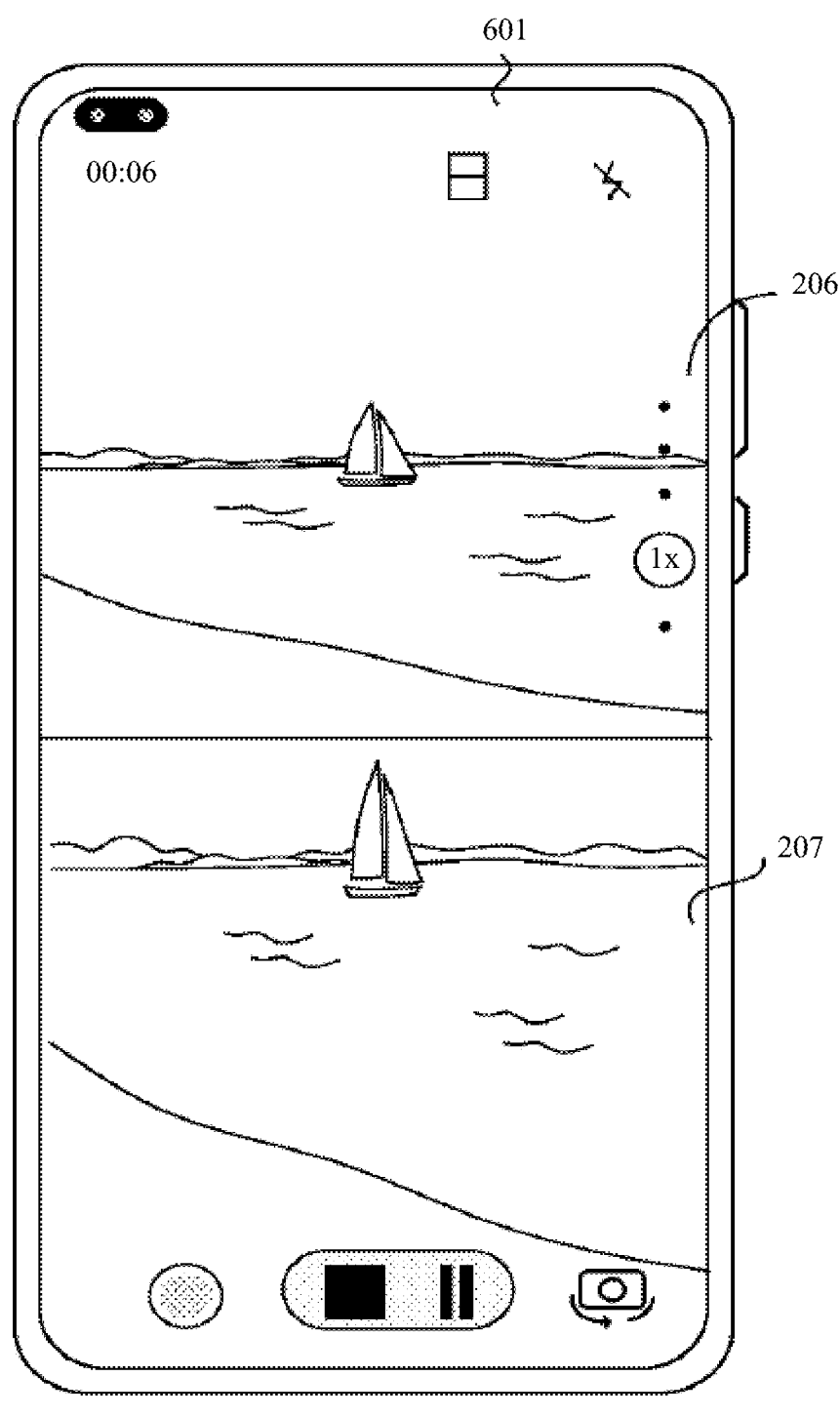

In this process, the video stream backhaul of the rear-facing camera a is not affected. As shown in FIG. 6(B), picture displaying of the viewfinder frame 206 during lens switching is not affected. However, due to a hardware response delay, there is a time gap between disabling the front-facing camera and normally uploading the video stream by the rear-facing camera b. In the time gap, picture displaying of the viewfinder frame 207 is affected. As shown in FIG. 6(B), a blank screen appears in the viewfinder frame 207 for a short time. Certainly, after the rear-facing camera b can normally upload the video stream, as shown in FIG. 6(C), the viewfinder frame 207 of the interface 601 can display, in real time, the video stream uploaded by the rear-facing camera b, and the viewfinder frame 206 can display, in real time, the video stream uploaded by the rear-facing camera a. In addition, the interface 601 is also an example of the sixth interface.

Figure 7A:
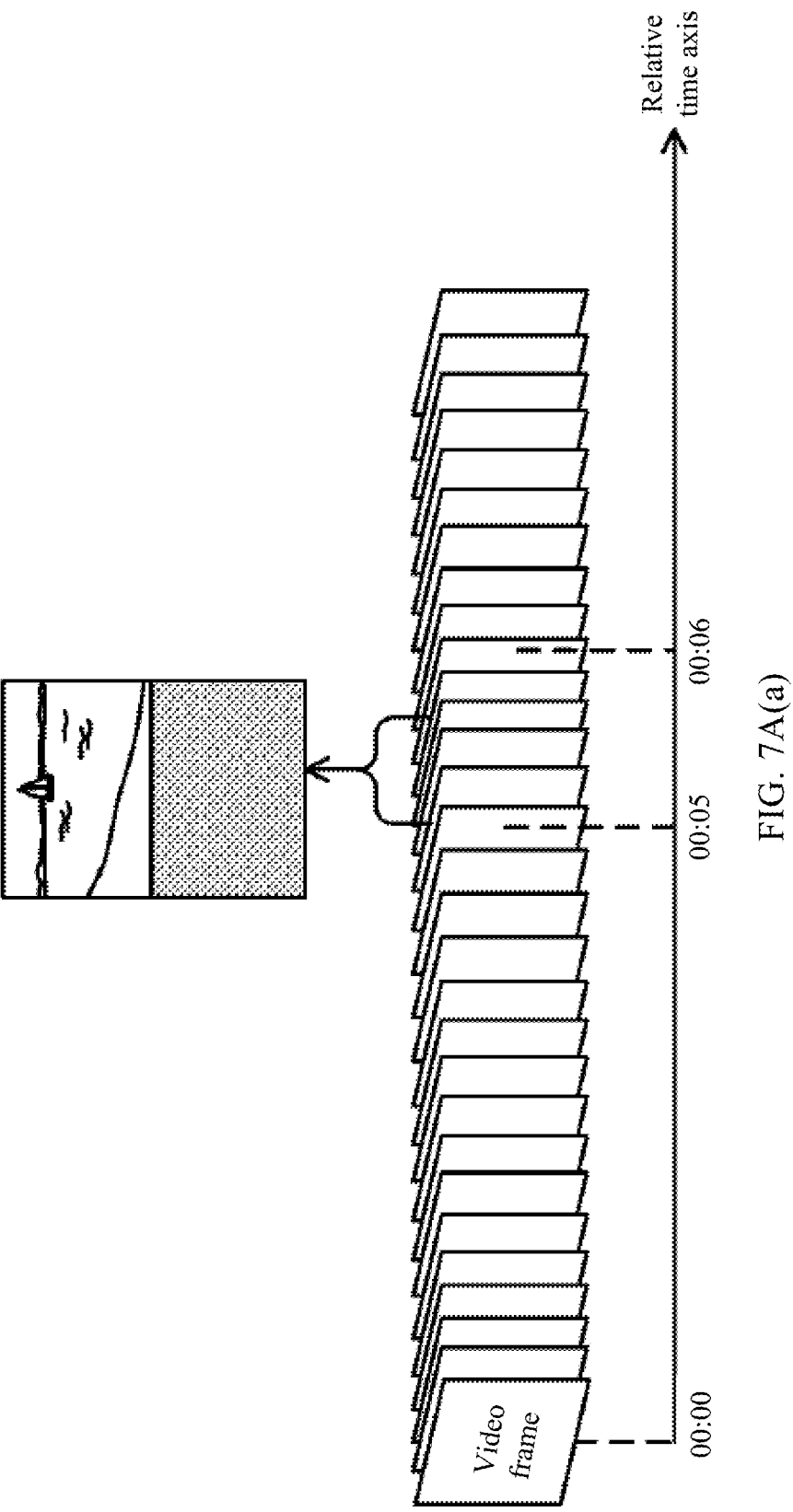
FIG. 7A(a) to FIG. 7A(c) are a first conceptual example diagram of processing video data 1 in a scenario in which a lens mode is switched from a front/rear mode to a rear/rear mode.
Figure 7A:
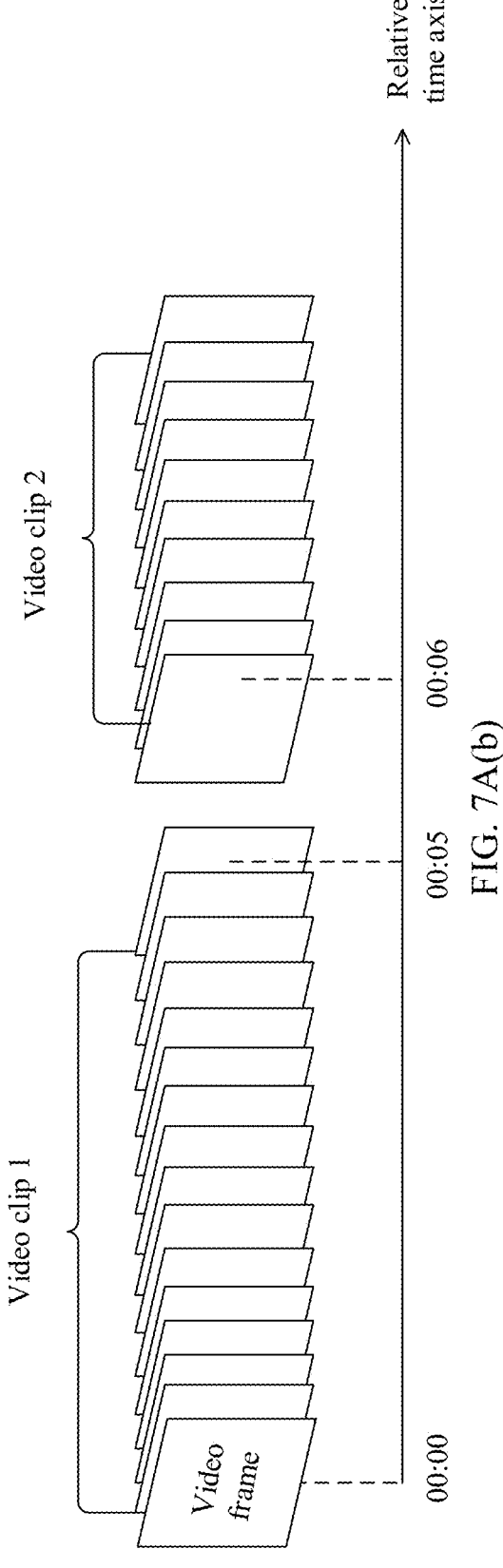
Figure 7A:
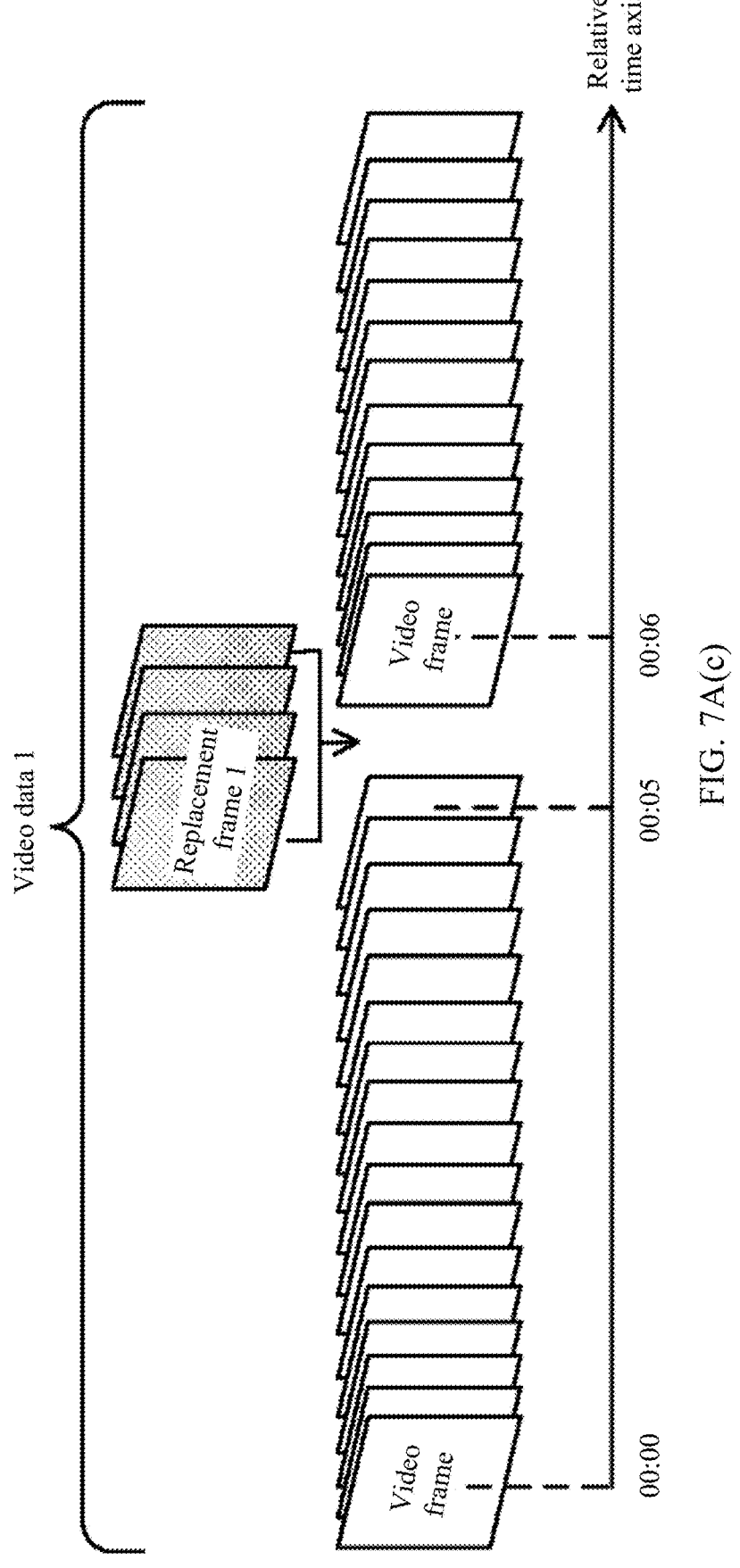

FIG. 7A(a) to FIG. 7A(c) are a conceptual example diagram of generating video data 1 in a case of lens mode switching (from a front/rear mode to a rear/rear mode) in a process of shooting a video by a mobile phone.

As shown in FIG. 7A(a), on a relative time axis of the video data 1, there are a plurality of video frames whose pictures are abnormal between a moment 00:05 (a first time point) and a moment 00:06. These video frames whose pictures are abnormal are caused by lens mode switching.

In some embodiments, the mobile phone may mark a video frame with a marker after indicating to enable the rear-facing camera b. After it is determined that the rear-facing camera b normally backhauls the video stream, marking is stopped. In this way, as shown in FIG. 7A(b), the mobile phone may remove a video frame corresponding to a marking location, so that a video clip 1 and a video clip 2 can be obtained. Then, to ensure continuity of the video data, as shown in FIG. 7A(c), the mobile phone may further add a replacement frame 1, that is, a video frame corresponding to the first time point, between the video clip 1 and the video clip 2, to obtain the video data 1.

Figure 7B:
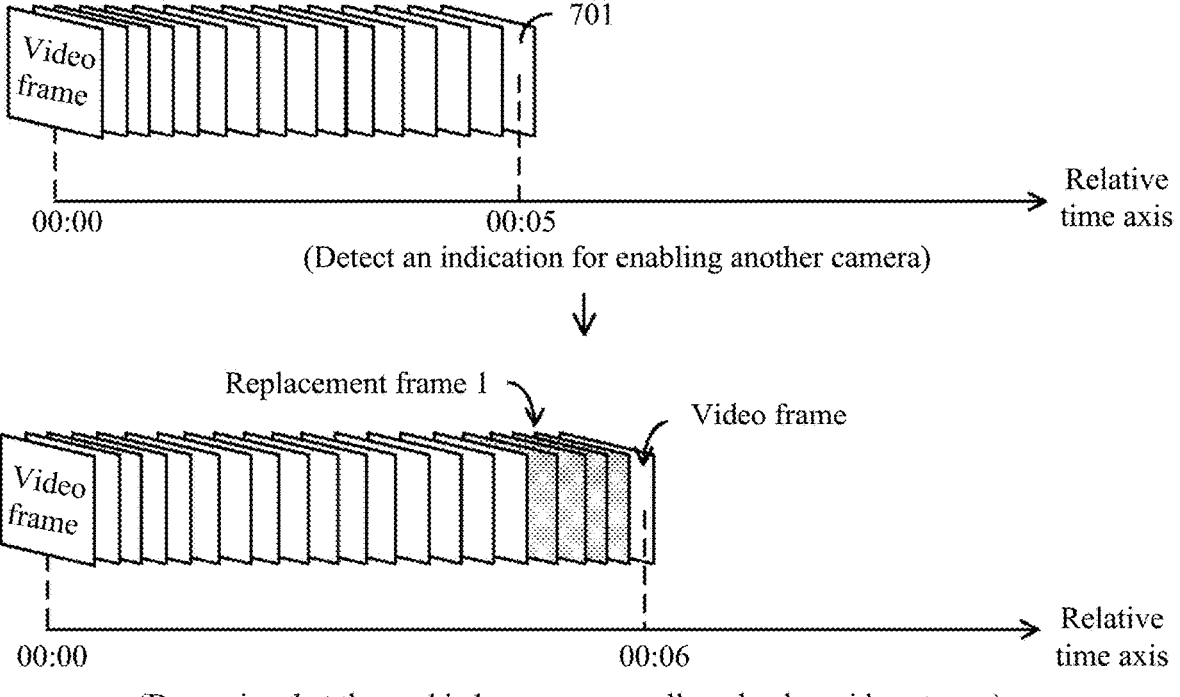
FIG. 7B is a second conceptual example diagram of processing video data 1 in a scenario in which a lens mode is switched from a front/rear mode to a rear/rear mode.

In some other embodiments, after determining that a new camera (namely, the rear-facing camera b) needs to be enabled, the mobile phone may freeze a collected last video frame, for example, perform frame freezing on a video frame 701 in FIG. 7B, to obtain the replacement frame 1, namely, the video frame corresponding to the first time point. After it is determined that the rear-facing camera b normally backhauls the video stream, frame freezing on the video frame 701 is canceled, and encoding is normally performed based on the video streams uploaded by the rear-facing camera a and the rear-facing camera b, to generate the video data 1.

It can be learned that adding of the replacement frame 1 mentioned in the foregoing embodiment may be performed after video shooting is completed, or may be performed during video shooting.

In addition, switching the lens mode does not interrupt normal video shooting. For example, after the mobile phone switches to the rear/rear mode, the mobile phone may display the interface 601 and perform video shooting. In this way, a quantity of video frames corresponding to the video data 1 continues to increase.

In the foregoing example, it is enumerated that the mobile phone switches the lens mode from the front/rear mode to the picture-in-picture mode, and switches from the front/rear mode to the rear/rear mode. In actual application, there also is a similar problem in switching between other lens modes, which can also be resolved by inserting a replacement frame, as described in the foregoing example. Details are not described herein again.

In addition, in some embodiments, the mobile phone may further receive, on the interface 601, an operation 4 that the user indicates to stop photographing. Then, the mobile phone may stop video shooting in response to the operation 4.

Figure 8A:
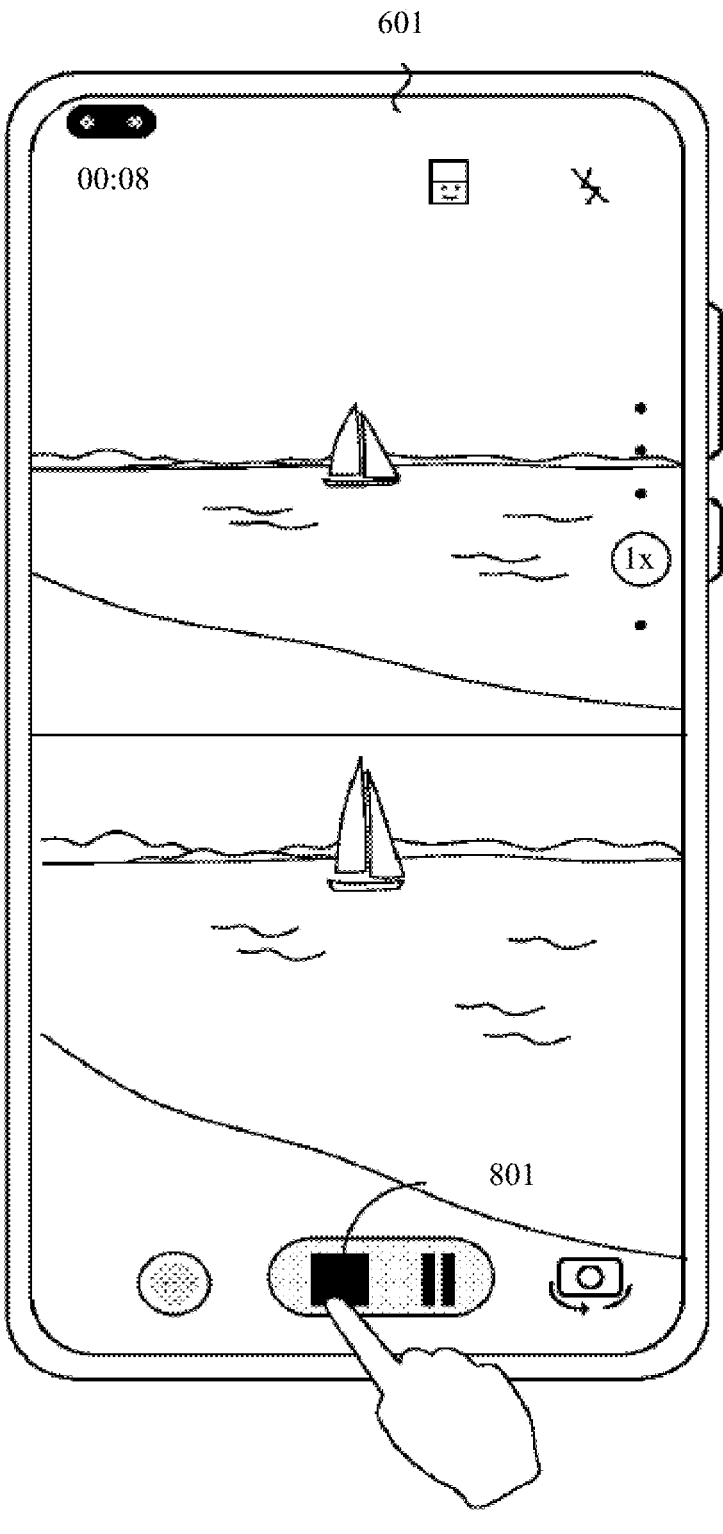
FIG. 8(A) to FIG. 8(C) are a fourth example diagram of a display interface according to an embodiment of this application.
Figure 8B:
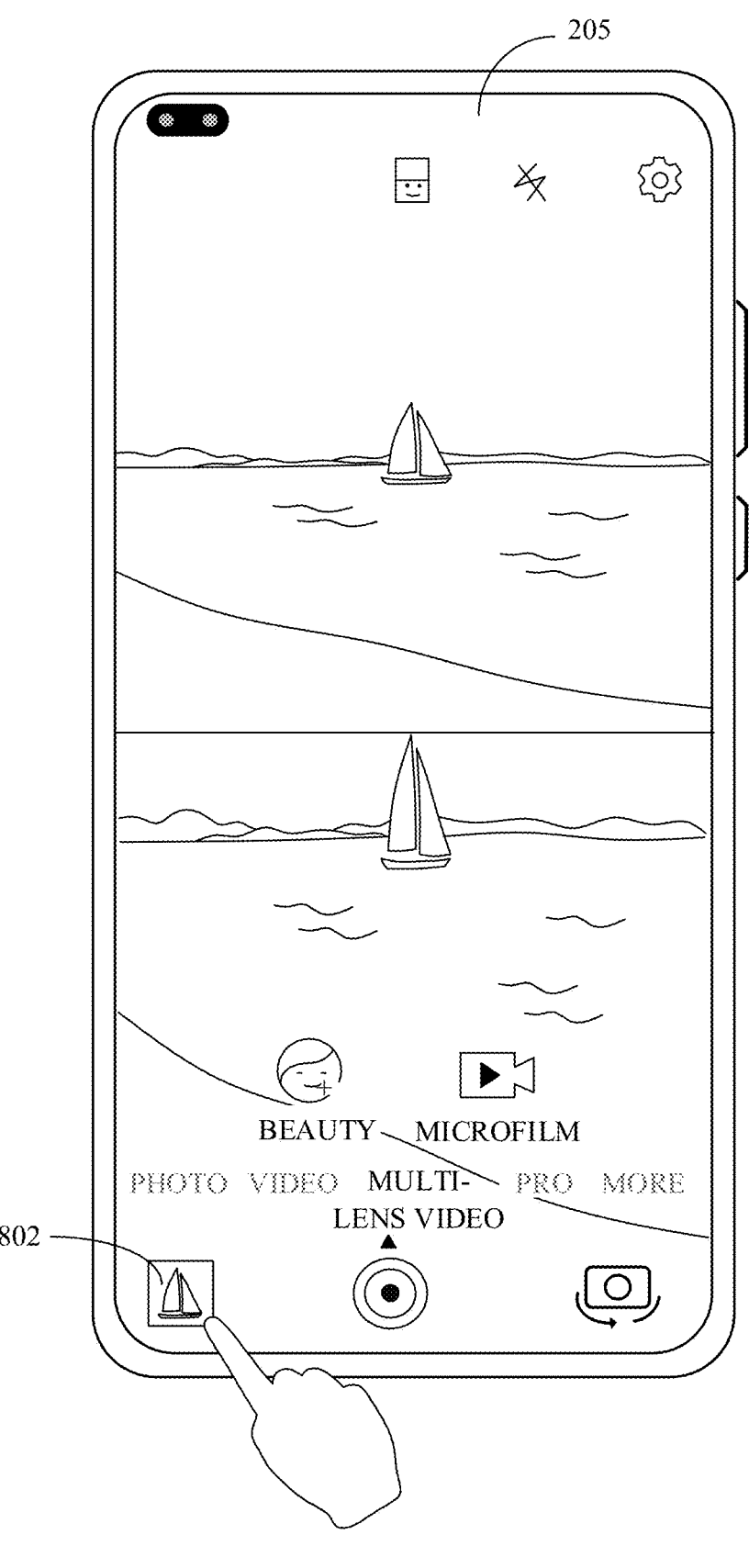

For example, as shown in FIG. 8(A), the interface 601 further includes a control used to indicate to pause photographing, which may also be referred to as a third control, for example, a control 801. The mobile phone may receive a fifth operation performed by the user on the control 801, for example, a tap operation. In response to the tap operation on the control 801, continuing photographing is stopped, and captured video data 1 is stored. In addition, as shown in FIG. 8(B), the interface 205 is displayed again. After the video data 1 (namely, first video data) is captured and stored, the displayed interface 205 may also be referred to as a first interface. In this scenario, the first interface is actually a viewfinder preview interface provided by a camera application.

For another example, based on an operation indicated by the user to exit the camera APP, for example, an up sliding operation on the interface 601, the mobile phone may stop continuing photographing, and store the captured video data 1. In addition, the mobile phone may further display the main interface again.

After the video data 1 is stored, the mobile phone may display the captured video data 1 based on the operation 4 of the user, to help the user view or edit the video data 1.

Figure 8C:
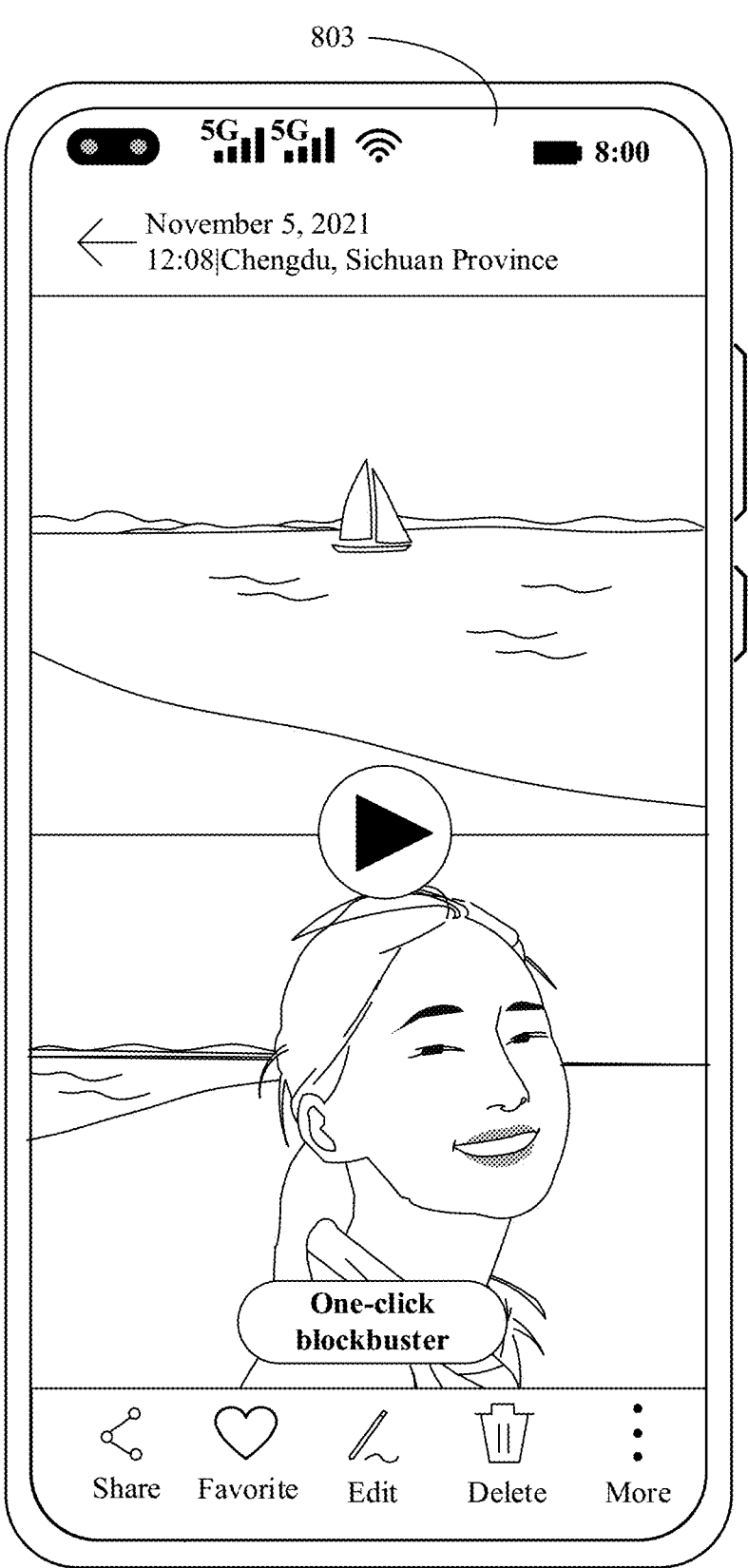

For example, in a scenario in which photographing is stopped and the mobile phone displays the interface 205, the interface 205 includes a thumbnail of the video data 1, for example, an icon 802, which may also be referred to as a first thumbnail. During displaying of the interface 205, the mobile phone may receive an operation performed by the user on the icon 802, and display, in response to the operation, a video editing interface, for example, an interface 803 shown in FIG. 8(C). The interface 803 is used to display the video data 1 and may also be referred to as a second interface.

Figure 9A:
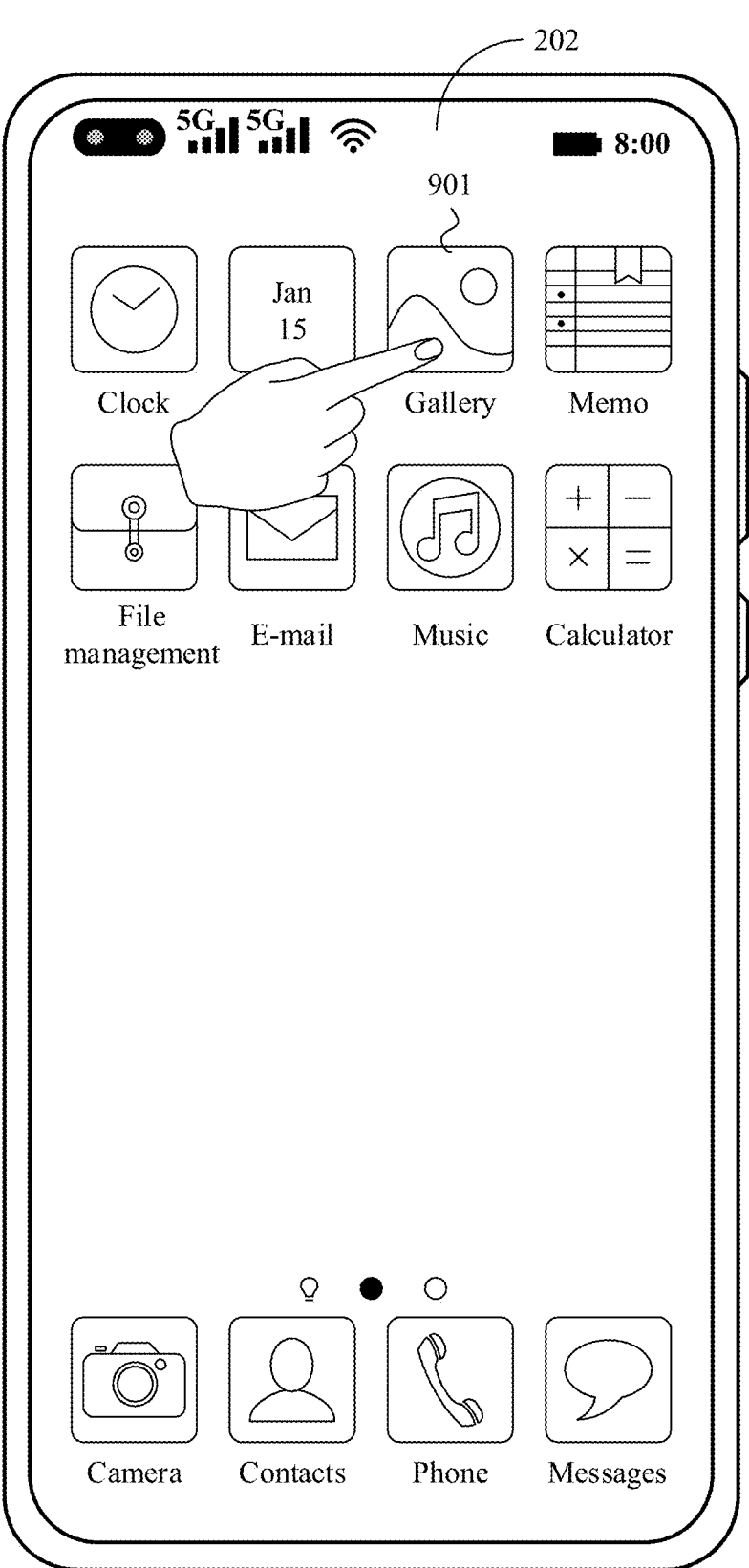
FIG. 9(A) to FIG. 9(C) are a fifth example diagram of a display interface according to an embodiment of this application.
Figure 9B:
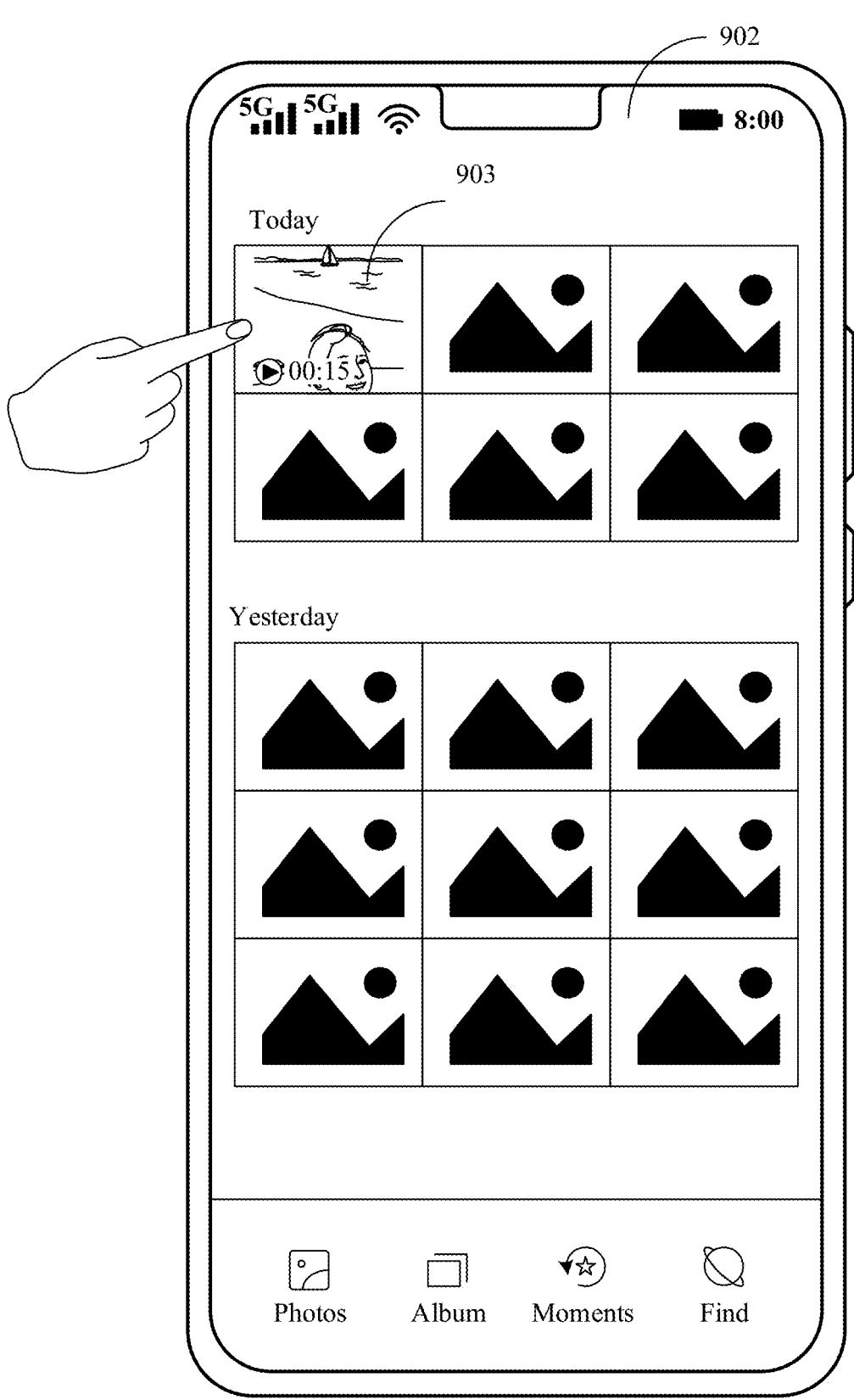

For another example, in a scenario in which photographing is stopped and the mobile phone displays the interface 205, based on an operation indicated by the user to exit the camera APP, for example, an up sliding operation, the mobile phone may display the main interface of the mobile phone again, namely, the desktop 202. The desktop 202 further includes an icon of a gallery APP. In this way, as shown in FIG. 9(A), during displaying of the desktop 202, the mobile phone may receive a sixth operation, for example, a tap-selection operation, on an icon 901 of the gallery APP, and display, in response to the operation, an application interface provided by the gallery APP, for example, an interface 902 shown in FIG. 9(B). Certainly, in a scenario in which photographing is stopped and the mobile phone displays the main interface, the mobile phone may directly receive a tap-selection operation on the icon 901 of the gallery APP, and display, in response to the operation, an application interface provided by the gallery APP, for example, an interface 902 shown in FIG. 9(B).

In some embodiments, the interface 902 displays thumbnails of various picture resources and video resources. These picture resources or video resources may be captured and stored by the mobile phone, for example, a thumbnail 903 (also referred to as a first thumbnail) of video data 1. Alternatively, the thumbnails may be thumbnails of an image, a video, and the like that are downloaded from the Internet, or may be thumbnails of an image, a video, and the like that are synchronized to a cloud. In some examples, the interface 902 used to display the thumbnails of the video resources may also be referred to as a first interface. In this scenario, the first interface is actually an application interface provided by the gallery application.

Figure 9C:
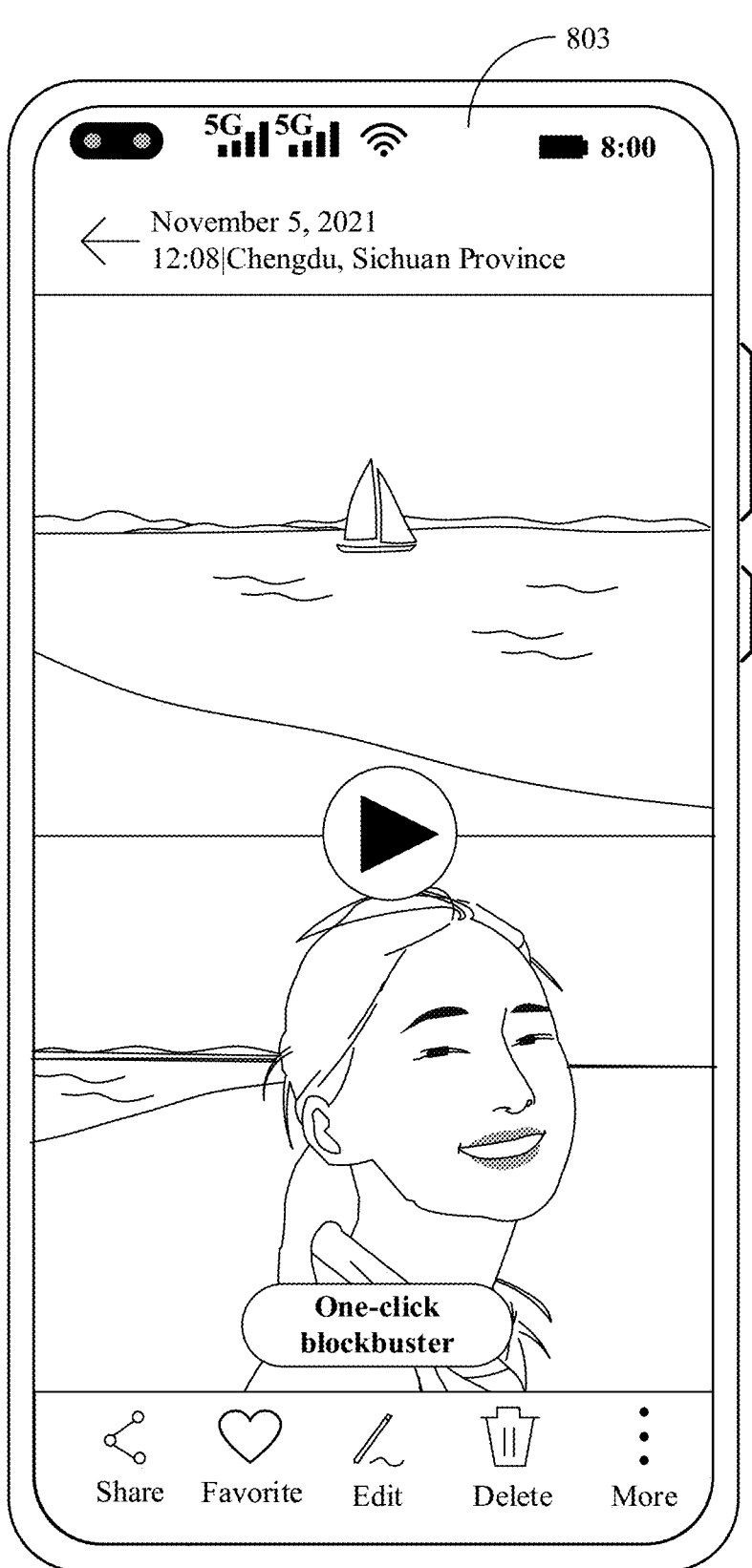

In some embodiments, the mobile phone may receive a selection operation performed by the user on a thumbnail of any video on the interface 902, and in response to the selection operation performed by the user on the thumbnail of the any video, the mobile phone may display a corresponding video editing interface. For example, the mobile phone may display an interface 803 shown in FIG. 9(C) in response to a first operation, for example, a tap operation, performed by the user on the thumbnail 903 on the interface 902. The interface 803 is a video editing interface corresponding to the video data 1, and may also be referred to as a second interface.

Figure 10:
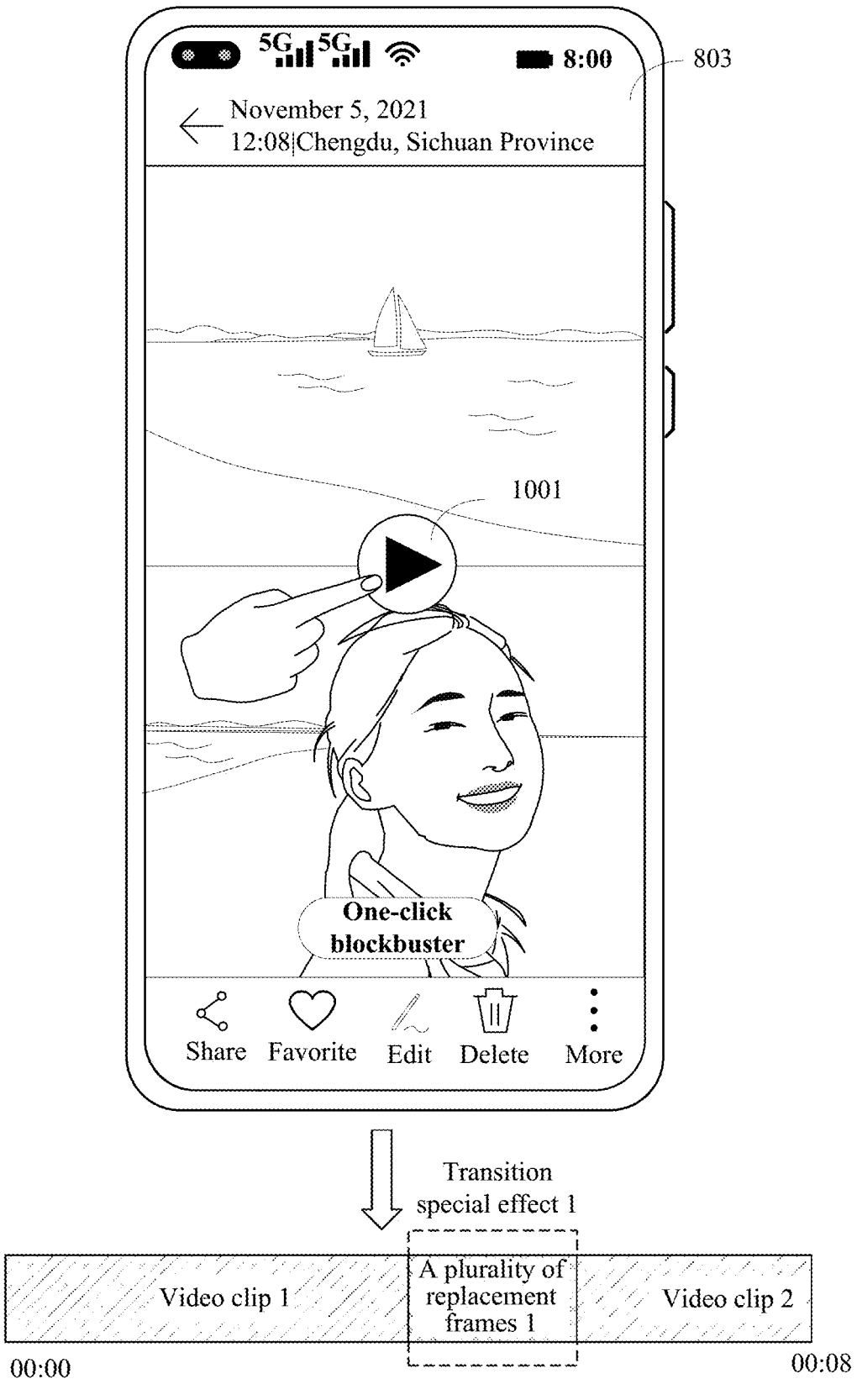
FIG. 10 is a sixth example diagram of a display interface according to an embodiment of this application.

In some embodiments, the mobile phone may play a corresponding video based on an operation performed by the user on the foregoing video editing interface. For example, as shown in FIG. 10, the interface 803 includes a control used to indicate to play the video data 1, for example, a control 1001. When the mobile phone receives a tap operation performed by the user on the control 1001, the mobile phone plays the video data 1 on the interface 803.

It may be understood that, when the replacement frame 1 is added to the video data 1, that a picture is still occurs during playing. In this embodiment of this application, when adding a replacement frame to the video data 1, the mobile phone may further superimpose a transition special effect on the plurality of replacement frames 1, for example, referred to as a transition special effect 1 or referred to as a first transition special effect. The replacement frame 1 on which the first transition special effect is actually superimposed may also be referred to as a first video frame.

In some examples, the transition special effect 1 may be any type of transition special effect pre-specified in the mobile phone, for example, one of a leftward shifting transition, a rightward shifting transition, a rotation transition, a dissolve transition, a blur transition, a melting transition, a black field transition, a white field transition, a zoom-in transition, a zoom-out transition, an upward shifting transition, and a downward shifting transition. In addition, it should be noted that, in the foregoing transition special effects, the leftward shifting transition and the rightward shifting transition are applicable only to a scene of portrait video shooting, and the upward shifting transition and the downward shifting transition are applicable only to a scene of landscape video shooting. In some other examples, the transition special effect 1 may be randomly determined by the mobile phone from the foregoing multi-type transition special effects.

In this way, in a process of playing the video data 1, the transition special effect 1 can better connect video clips before and after the replacement frame 1, that is, a transition between the video clip 1 and the video clip 2 can be better, thereby improving viewing experience of the user and improving video shooting quality.

In addition, in an area in which the transition special effect 1 is added, the mobile phone may further mark the replacement frame 1 on which the transition special effect is actually superimposed, so that the mobile phone can identify a location in which the transition is added.

Figure 11:
FIG. 11 is a seventh example diagram of a display interface according to an embodiment of this application.

In some other embodiments, the mobile phone may automatically perform secondary creation on the video data 1 based on an operation performed by the user on the video editing interface, for example, configure video music, and add the transition special effect. For example, as shown in FIG. 11, the interface 803 further includes a control used to indicate to edit the video data 1, for example, a one-click blockbuster control 1101. When the mobile phone receives an operation, for example, referred to as a second operation, performed by the user on the one-click blockbuster control 1101, the mobile phone may automatically edit the video data 1.

Figure 12:
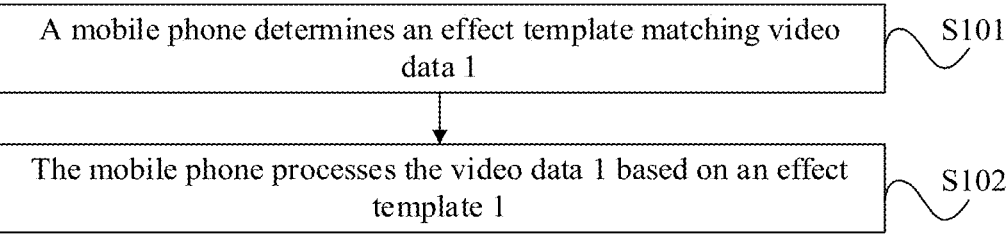
FIG. 12 is a flowchart of steps of a video data transition processing method according to an embodiment of this application.

In some embodiments, as shown in FIG. 12, the mobile phone may automatically edit the video data 1, which may include the following steps:

S101: The mobile phone determines an effect template matching the video data 1.

In some embodiments, a plurality of styles of effect templates may be pre-configured in the mobile phone, and each effect template corresponds to one piece of video music. In addition, the effect template also corresponds to a filter, a special effect, a transition, and a sticker.

In some embodiments, the mobile phone may analyze picture content of the video data 1 by using an artificial intelligence model, and determine the effect template matching the video data 1, that is, a first effect template, which is also referred to as an effect template 1. For example, the artificial intelligence model of the mobile phone is used to search for a similar video based on the picture content of the video data 1, and obtain video music used in the similar video. In this way, the corresponding effect template 1 is determined based on the obtained video music. For another example, the artificial intelligence model of the mobile phone is used to search for a similar video based on the picture content of the video data 1, determine, based on a style name of the similar video, a plurality of effect templates belonging to a same style, and then randomly determine the effect template 1 from the plurality of determined effect templates. In some other embodiments, the mobile phone may randomly determine an effect template as the effect template 1.

S102: The mobile phone processes the video data 1 based on the effect template 1.

For example, the mobile phone may adjust a volume of an original audio track of the video data 1 to zero, and then add video music (namely, first music) of a photographing template 1 to the video data 1, so that the video music matches a video picture of the video data 1. In another embodiment, the volume of the original audio track may also be adjusted to another decibel value based on an operation of the user.

For another example, the mobile phone may add a filter, a special effect, a transition, and a sticker corresponding to the effect template 1 to the video data 1. In a process of adding a transition special effect, the mobile phone may not only add a transition special effect to the video data 1, but also replace an original transition special effect in the video data 1 (for example, the transition special effect 1 superimposed on the replacement frame 1).

It may be understood that an adaptation degree between the effect template and each type of transition special effect varies. Usually, relatively speaking, a transition special effect with a higher an adaptation degree is more suitable for a style of the effect template and corresponding video music. Relatively speaking, a transition special effect with a lower an adaptation degree is less suitable for a style of the effect template and corresponding video music. In this embodiment, replacing the transition special effect 1 alleviates a problem that after the effect template is used to process the video data, the original transition special effect 1 conflicts with the processed video style.

Figure 13:
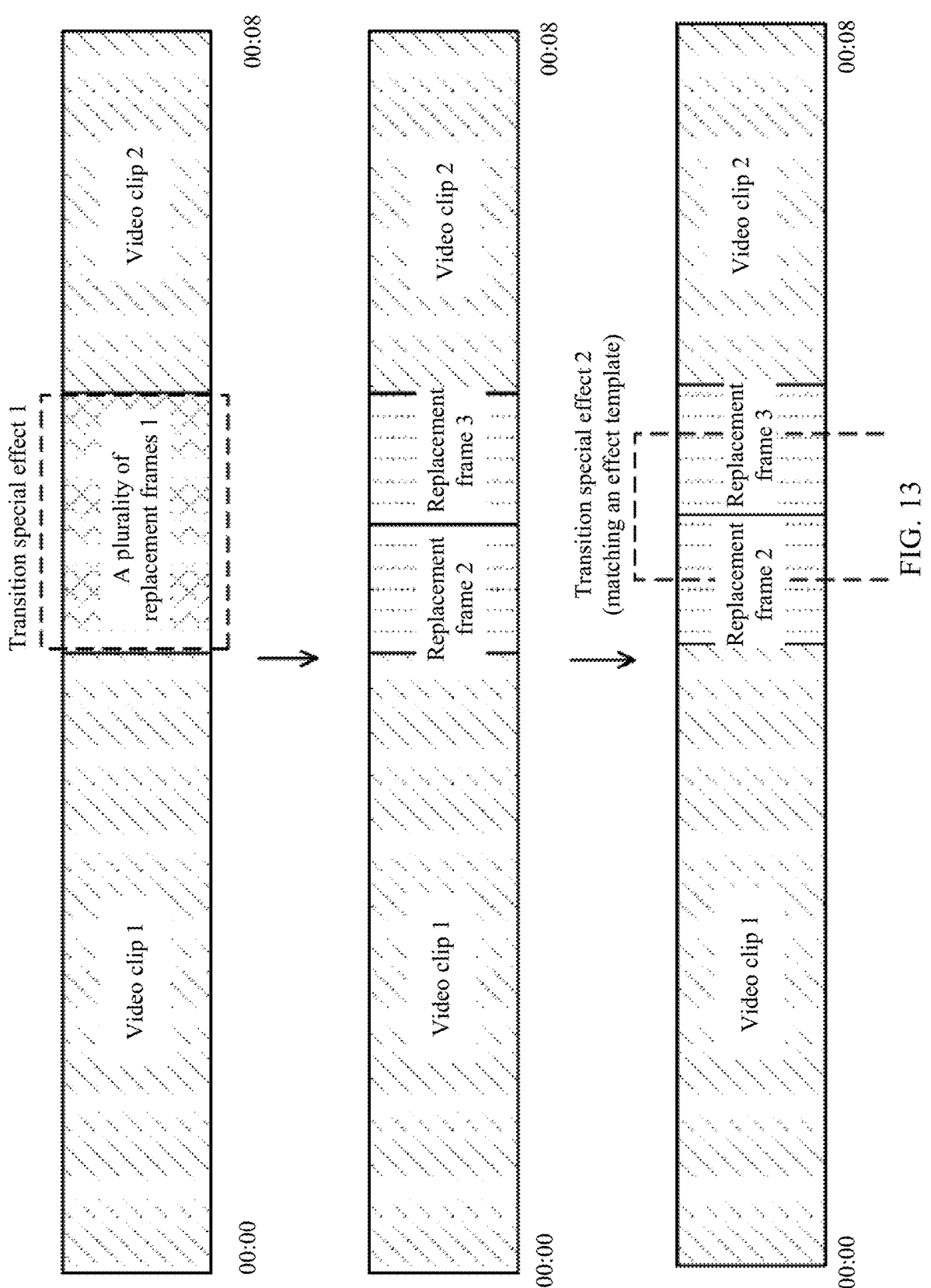
FIG. 13 is a conceptual example diagram of replacing an original transition special effect in video data 1.

In some embodiments, as shown in FIG. 13, the mobile phone may first identify whether there is the transition special effect 1 in the video data 1. For example, whether there is a mark in the video data 1 may be detected. When the mark is identified, a marked video frame (namely, the replacement frame 1 on which the transition special effect 1 is superimposed) is deleted. In this case, the video data 1 is divided into the video clip 1 and the video clip 2. Then, the mobile phone generates a plurality of replacement frames 2 and a plurality of replacement frames 3. The replacement frame 2 may be the same as a tail frame of the video clip 1, and the replacement frame 3 is the same as a head frame of the video clip 2. The tail frame of the video clip 1 and the head frame of the video clip 2 may be collectively referred to as a second video frame.

In some examples, the replacement frame 2 may be an image frame obtained after the mobile phone performs freezing processing on the tail frame of the video clip 1. The replacement frame 2 may be an image frame obtained after the mobile phone performs freezing processing on the head frame of the video clip 2. In addition, a total quantity of the replacement frames 2 and the replacement frames 3 is the same as a quantity of deleted video frames, ensuring that a final length of the video data 1 is not affected. Then, the mobile phone determines a transition special effect 2 based on an adaptation degree between the effect template 1 and each type of transition special effect, and superimposes the transition special effect 2 between the replacement frame 2 and the replacement frame 3, to connect the video clip 1 and the video clip 2.

In some embodiments, the adaptation degree between the effect template and the transition special effect may be quantized as a matching weight. In this way, when determining the transition special effect 2, with reference to a matching weight between the effect template 1 and each transition special effect, the mobile phone may randomly select, from the plurality of types of transition special effects, the transition special effect 2 matching the effect template 1. It may be understood that, relatively speaking, a transition special effect with a higher matching weight is more likely to be selected as the transition special effect 2 matching the effect template 1. Relatively speaking, a transition special effect with a lower matching weight is less likely to be selected as the transition special effect 2 matching the effect template 1.

In some examples, the matching weight between the effect template and the transition special effect may be pre-configured, for example, as shown in Table 1:

TABLE 1

| | | Style | | |
| --- | --- | --- | --- | --- |
| | | Relaxing | | Joyful |
| | | Effect template Name | | |
| | Hello summer | Little beauty | sunny | HAPPY |
| | | Display sequence | | |
| | 1 | 4 | 2 | 3 |
| Video music | Hello summer | Romantic | Comfortable | Happy |
| Transition Type special | Dissolve (50%) Blur (0%) | Dissolve (50%) Blur (0%) | Dissolve (90%) Blur (0%) | Dissolve (30%) Blur (0%) |

TABLE 1-continued

| | Style | | | |
|---|---|---|---|---|
| | Relaxing | | | Joyful |
| | Effect template Name | | | |
| | Hello summer | Little beauty | sunny | HAPPY |
| | Display sequence | | | |
| | 1 | 4 | 2 | 3 |
| effect | Melting (0%) | Melting (0%) | Melting (0%) | Melting (0%) |
| | Upward shifting (50%) | Upward shifting (90%) | Upward shifting (30%) | Upward shifting (70%) |
| | Downward shifting (50%) | Downward shifting (90%) | Downward shifting (30%) | Downward shifting (70%) |
| | Leftward shifting (50%) | Leftward shifting (90%) | Leftward shifting (30%) | Leftward shifting (70%) |
| | Rightward shifting (50%) | Rightward shifting (90%) | Rightward shifting (30%) | Rightward shifting (70%) |
| | Black field (90%) | Black field (90%) | Black field (90%) | Black field (50%) |
| | White field (90%) | White field (90%) | White field (90%) | White field (30%) |
| | Zoom-in (90%) | Zoom-in (50%) | Zoom-in (70%) | Zoom-in (90%) |
| | Zoom-out (90%) | Zoom-out (50%) | Zoom-out (70%) | Zoom-out (90%) |
| | Rotation (30%) | Rotation (50%) | Rotation (0%) | Rotation (90%) |

Table 1 exemplifies a correspondence between different effect templates and matching weights of video music, styles, and different transition special effects. A value of a percentage corresponding to each transition special effect in the table is a matching weight between the transition special effect and the effect template. A style corresponding to the effect template 1 is also referred to as a first style.

The effect template of Hello summer recorded in Table 1 is used as an example. A matching weight between the effect template and the dissolve transition is 50%, that is, the dissolve transition has a 50% probability of being selected as the matched transition special effect. In addition, a matching weight between the effect template and the blur transition is 0%, that is, the blur transition is not selected as the matched transition special effect. A matching weight between the effect template and the melting transition is 0%, that is, the melting transition is not selected as the matched transition special effect. A matching weight between the effect template and the upward shifting transition is 50%. That is, in a scenario in which the mobile phone needs to process landscape video data 1, the upward shifting transition has a 50% probability of being selected as the matched transition special effect. A matching weight between the effect template and the downward shifting transition is 50%. Certainly, in a scenario in which the mobile phone needs to process the landscape video data 1, the downward shifting transition has a 50% probability of being selected as the matched transition special effect. A matching weight between the effect template and the leftward shifting transition is 50%. That is, in a scenario in which the mobile phone needs to process portrait video data 1, the leftward shifting transition has a 50% probability of being selected as the matched transition special effect. A matching weight between the effect template and the rightward shifting transition is 50%. Certainly, in a scenario in which the mobile phone needs to process the portrait video data 1, the rightward shifting transition has a 50% probability of being selected as the matched transition special effect. A matching weight between the effect template and the black field transition is 90%, that is, the black field transition has a 90% probability of being selected as the matched transition special effect. A matching weight between the effect template and the white field transition is 90%, that is, the white field transition has a 90% probability of being selected as the matched transition special effect. A matching weight between the effect template and the zoom-in transition is 90%, that is, the zoom-in transition has a 90% probability of being selected as the matched transition special effect. A matching weight between the effect template and the zoom-out transition is 90%, that is, the zoom-out transition has a 90% probability of being selected as the matched transition special effect. A matching weight between the effect template and the rotation transition is 30%, that is, the rotation transition has a 30% probability of being selected as the matched transition special effect.

That is, the mobile phone may randomly select, by using the matching weight corresponding to each transition special effect, the transition special effect 2 that replaces the transition special effect 1. This selection manner not only provides high flexibility, but also can ensure that there is a high probability that a high association exists between the selected transition special effect 2 and the effect template 1. In addition, in a scenario in which the transition special effect is added to the video data 1, the mobile phone may randomly determine, by using the matching weight corresponding to each transition special effect, a transition special effect 3 (also referred to as a third transition special effect) matching the effect template 1, and add the transition special effect 3 to the video data 1, for example, add the transition special effect 3 to a video frame corresponding to a second time point in the video data 1. The video frame corresponding to the second time point may be video frames that are in the video data 1 and that are located before and after the second time point. In this way, the processed video data 1 can present a style that is closer to an expected effect of an effect model.

In some other embodiments, the effect template 1 may further have one or more association identifiers with one or more transition special effects. When the effect template 1 is used to process the video data 1, a transition special effect with the association identifier may be preferentially selected as the transition special effect 2.

In some other embodiments, after the video data 1 is processed by using the matched effect template 1, the mobile phone may further replace, based on an operation of the user, the effect template used when the video data 1 is processed, or separately change the video music used.

Figure 14A:
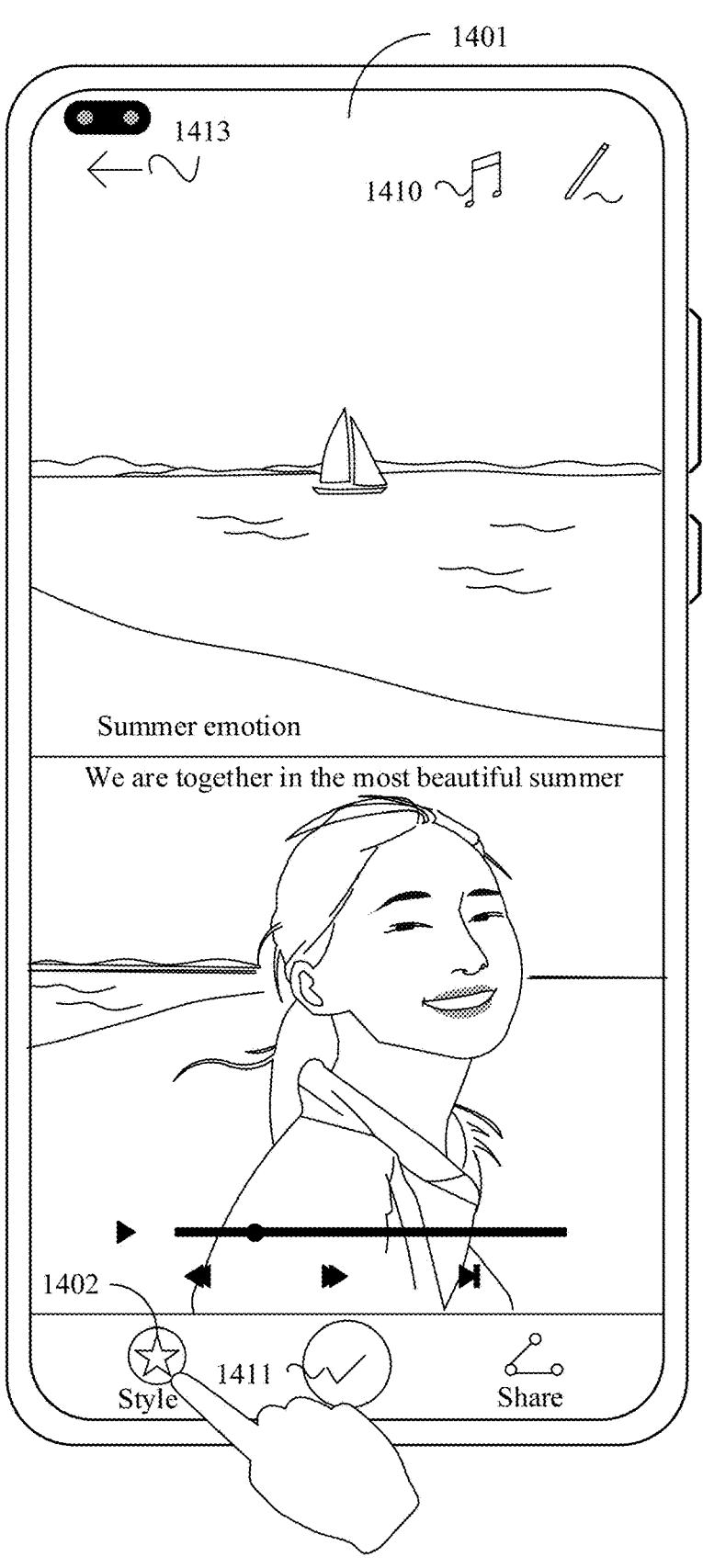
FIG. 14(A) to FIG. 14(D) are an eighth example diagram of a display interface according to an embodiment of this application.
Figure 14B:
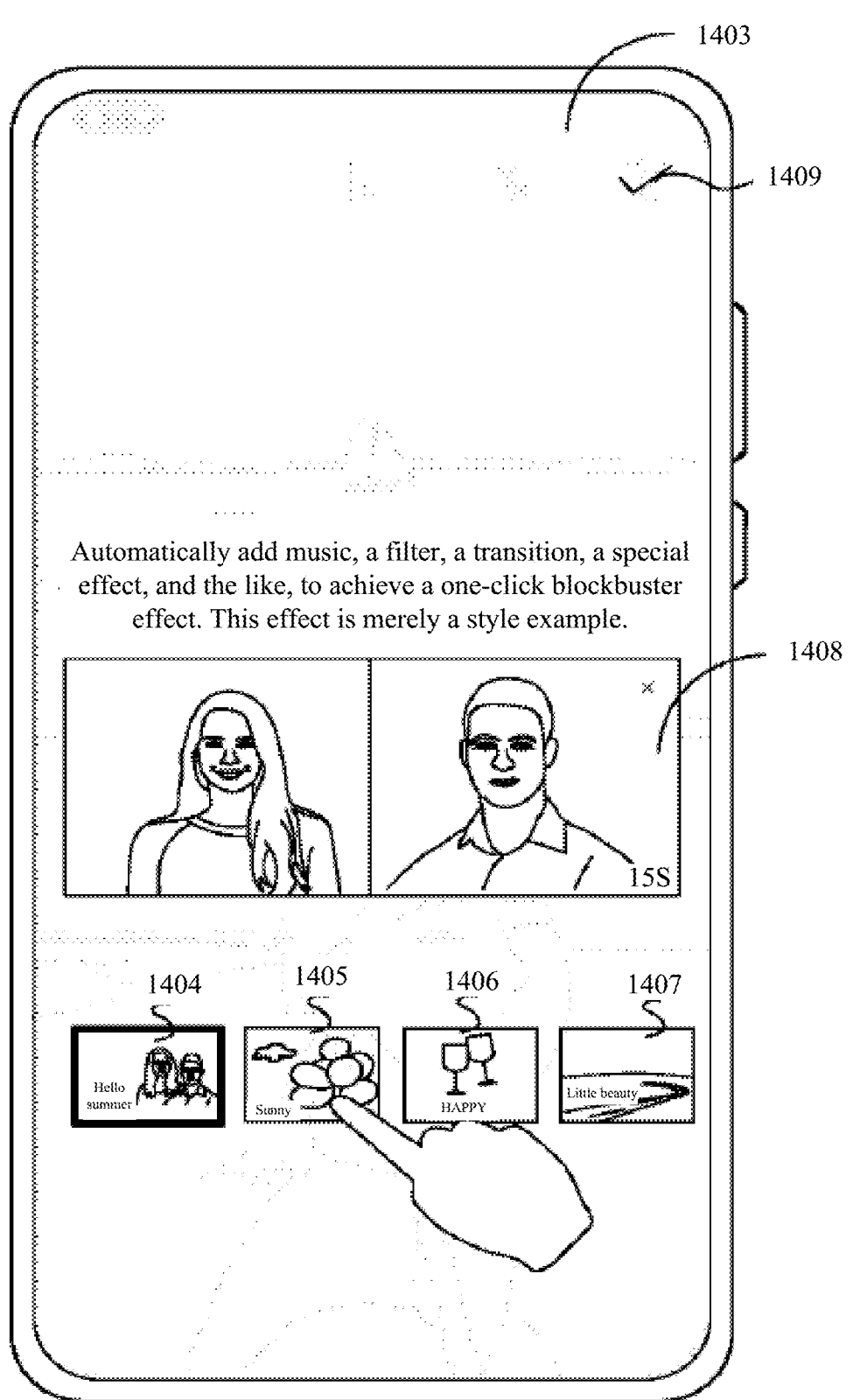
Figure 14C:

For example, as shown in FIG. 14(A), after the mobile phone processes the video data 1 by using the effect template, the mobile phone may display a preview interface, for example, an interface 1401, which is referred to as a third interface. The third interface is configured to display video data 2, which is also referred to as second video data. The video data 2 is a video obtained after effect template processing on a basis of the video data 1. The second video data includes the video frame, the replacement frame (for example, the replacement frame 2 and the replacement frame 3), video music (for example, referred to as the first music) corresponding to the effect template 1, and the transition special effect 2 (also referred to as a second transition special effect) that are in the video data 1. The mobile phone may receive an operation 6 of the user on the interface 1401, for example, an operation of tapping a style control 1402 on the interface 1401, and display an interface 1403 in response to the operation 6, as shown in FIG. 14(B). The interface 1403 is a guide interface that guides the user in selecting an effect template. The interface 1403 includes a plurality of template windows, for example, a window 1404, a window 1405, a window 1406, and a window 1407, that indicate different effect templates. The window 1404 is used to indicate an effect template named Hello summer, the window 1405 is used to indicate an effect template named sunny, the window 1406 is used to indicate an effect template named HAPPY, and the window 1407 is used to indicate an effect template named Little beauty. In these effect templates, a template window of the Hello summer effect template is in a selected state, indicating that the effect template 1 is the Hello summer effect template. In this way, the mobile phone may determine, based on an operation performed by the user on another template window, the effect template 2 selected by the user. For example, after the mobile phone receives a tap operation performed by the user on the window 1405, a preview window 1408 on the interface 1403 may display a sample of the sunny effect template. In this way, if the mobile phone receives an operation performed by the user on a control 1409 on the interface 1403, it can be determined that the sunny effect template is the selected effect template 2. Then, the mobile phone may process the original video data 1 by using the effect template 2 to obtain the video data 1 meeting a style of the effect template 2, and as shown in FIG. 14(C), display the interface 1401 again. In this case, the interface 1401 includes the video data 1 processed based on the effect template 2.

In addition, during displaying of the interface 1403, when the mobile phone does not receive an operation that the user indicates to select another effect template, the mobile phone receives an operation performed by the user on the control 1409. The mobile phone may determine that the user indicates to reprocess the original video data 1 by using the effect template 1. In a reprocessing process, the transition special effect 2 and the transition special effect 3 may still be randomly re-determined by using the matching weight between each transition special effect and the effect template 1, and are used to reprocess the original video data 1. It may be understood that the randomly re-determined transition special effect 2 and transition special effect 3 may be different from the transition special effects determined by using the effect template 1 for the first time. In this way, a visual effect of the video data 1 obtained after reprocessing also varies, thereby improving diversity of one-click filming.

For another example, the mobile phone may receive an operation 7 of the user on the interface 1401, for example, an operation of tapping a music control 1410 on the interface 1401, and respond to the operation 7 to change to different video music. The changed-to video music may be music of a same style corresponding to the effect template 2, or may be random music. This is not limited.

Figure 14D:

In addition, the interface 1401 further includes a control 1411 that indicates determining. As shown in FIG. 14(C), after receiving an operation, for example, a tap operation, performed by the user on the control 1411, the mobile phone saves the processed video data 1. For example, the video data 1 processed based on the effect template is also referred to as the video data 2. In addition, the mobile phone may further display a video editing interface corresponding to the video data 2, for example, an interface 1412 shown in FIG. 14(D). The interface 1412 may display the video data 2. The mobile phone may play the video data 2 based on an operation performed by the user on the interface 1412.

In a possible embodiment, the interface 1401 may further include a control indicating to cancel an effect template, for example, a control 1413 shown in FIG. 14(A). The mobile phone may receive a tap operation performed by the user on the control 1413, delete the video data 1 processed based on the effect template, and display the interface 803 again. When the mobile phone displays the interface 803 again, the interface 803 still includes the one-click blockbuster control 1101. If the mobile phone receives the operation performed by the user on the one-click blockbuster 1101 again, the mobile phone may determine a matched effect template again, and process the video data 1 again by using the newly determined effect template. For a processing process, refer to the foregoing embodiment. Details are not described herein again. In addition, for a same segment of video data 1, the mobile phone can ensure that effect templates determined by using the one-click blockbuster for two adjacent times are different, thereby improving diversity of secondary creation of the video data.

An embodiment of this application further provides an electronic device. The electronic device may include a memory and one or more processors. The memory is coupled to the processor. The memory is configured to store computer program code, and the computer program code includes computer instructions. When the processor executes the computer instructions, the electronic device is enabled to perform steps performed by the mobile phone in the foregoing embodiments. Certainly, the electronic device includes but is not limited to the foregoing memory and one or more processors. For example, for a structure of the electronic device, refer to the structure of the mobile phone shown in FIG. 1.

Figure 15:
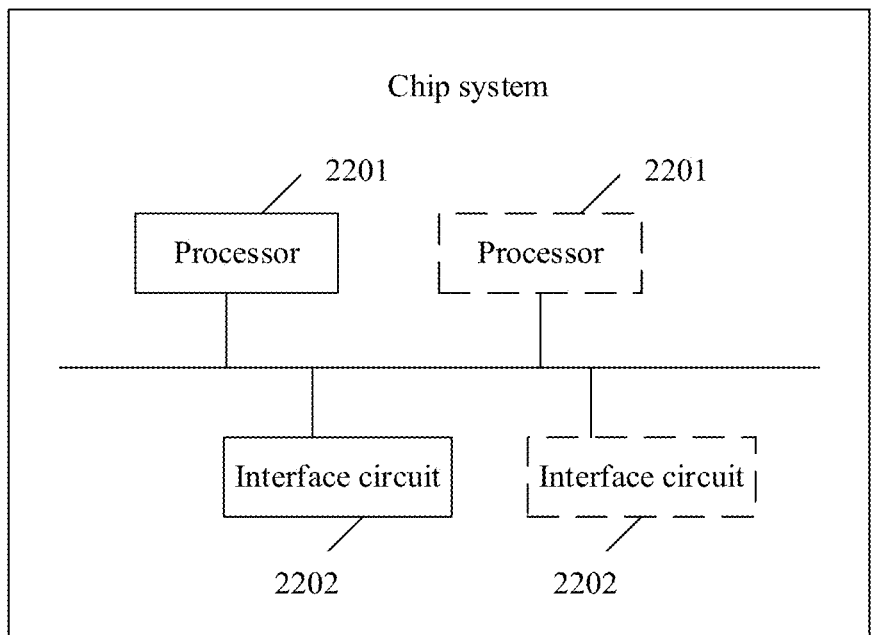
FIG. 15 is a schematic diagram of composition of a chip system according to an embodiment of this application.

An embodiment of this application further provides a chip system, and the chip system may be applied to the electronic device in the foregoing embodiment. As shown in FIG. 15, the chip system includes at least one processor 2201 and at least one interface circuit 2202. The processor 2201 may be the processor in the foregoing electronic device. The processor 2201 and the interface circuit 2202 may be interconnected by using a line. The processor 2201 may receive computer instructions from the memory of the foregoing electronic device by using the interface circuit 2202 and execute the computer instructions. When the computer instructions are executed by the processor 2201, the electronic device is enabled to perform the steps performed by the mobile phone in the foregoing embodiments. Certainly, the chip system may further include other discrete devices. This is not specifically limited in this embodiment of this application.

In some embodiments, it may be clearly understood by a person skilled in the art through descriptions of the foregoing implementations that, for ease and brevity of description, division of the foregoing functional modules is merely used as an example for description. In actual application, the foregoing functions may be allocated to different functional modules for implementation based on requirements, that is, an internal structure of the apparatus is divided into different functional modules, to complete all or some of the functions described above. For a specific working process of the system, the apparatus, and the unit described above, refer to a corresponding process in the foregoing method embodiment. Details are not described herein again.

Functional units in embodiments of this application may be integrated into one processing unit, or each unit may exist separately physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of embodiments of this application. However, the protection scope of embodiments of this application is not limited thereto. Any change or replacement within the technical scope disclosed in embodiments of this application shall fall within the protection scope of embodiments of this application. Therefore, the protection scope of embodiments of this application shall be subject to the protection scope of the claims.

What is claimed is:

1. A video data transition processing method, wherein the method is applied to an electronic device, and the method comprises:

displaying, by the electronic device, a first interface, wherein the first interface comprises a first thumbnail of first video data, the first video data comprises a first transition special effect, and the first transition special effect is superimposed on consecutive first video frames in the first video data;

receiving, by the electronic device, a first operation performed by a user on the first thumbnail;

displaying, by the electronic device, a second interface in response to receiving the first operation, wherein the second interface is a video editing interface of the first video data, and the second interface comprises a one-click blockbuster control;

generating, automatically and by the electronic device, in response to a second operation performed by the user on the one-click blockbuster control, second video data, wherein generating the second video data comprises:

determining an effect template according to picture content of the first video data;

detecting a mark in the first video data;

deleting at least one marked video frame from the first video data in response to detecting the mark in the first video data, wherein the at least one marked video frame is the consecutive first video frames in the first video data on which the first transition special effect is superimposed, wherein the deleting the marked video frame divides the first video data into a first video clip and a second video clip;

generating replacement frames comprising at least one first replacement frame generated from the first video clip and at least one second replacement frame generated from the second video clip;

determining a second transition special effect according to an adaptation degree between the effect template and the second transition special effect; and generating the second video data by superimposing the second transition special effect on the at least one first replacement frame and the at least one second replacement frame and connecting the first video clip with the second video clip; and displaying, by the electronic device, a third interface after receiving the second operation performed by the user on the one-click blockbuster control, wherein the third interface is used to display the second video data, wherein the second video data comprises third video frames of the first video data, replacement frames, first music, and wherein the second transition special effect corresponds to the first music.

2. The method according to claim 1, wherein a first interface, the method further comprises performing, before the displaying the first interface:

displaying, by the electronic device, a fourth interface, wherein the fourth interface is a viewfinder preview interface provided by a camera application, and the fourth interface comprises a first control indicating to enable video shooting;

receiving, by the electronic device, a third operation performed by the user on the first control;

displaying, by the electronic device, a fifth interface in response to the third operation, and starting recording the first video data, wherein the fifth interface is a video recording interface in a first lens mode, and the fifth interface comprises a second control indicating to switch a lens mode;

when recording reaches a first time point of the first video data, displaying, by the electronic device, a sixth interface in response to a fourth operation performed by the user on the second control, and determining a video frame corresponding to the first time point as a first video frame of the first video frames, wherein the sixth interface is a video recording interface in a second lens mode, and the sixth interface comprises a third control indicating to stop shooting;

receiving, by the electronic device, a fifth operation performed by the user on the third control; and superimposing, by the electronic device, the first transition special effect on the first video frames; and wherein the displaying, by the electronic device, the first interface comprises: displaying, by the electronic device, the first interface in response to the fifth operation, wherein the first interface is a viewfinder preview interface provided by the camera application.

3. The method according to claim 1, wherein the method further comprises performing, before the displaying the first interface:

displaying, by the electronic device, a main interface, wherein the main interface comprises an icon of a gallery application; and receiving, by the electronic device, a sixth operation performed by the user on the icon of the gallery application; and wherein the displaying, by the electronic device, the first interface comprises: displaying, by the electronic device, the first interface in response to the sixth operation, wherein the first interface is an application interface provided by the gallery application.

4. The method according to claim 2, wherein the determining the effect template comprises determining, by the electronic device, a first effect template from a plurality of pre-configured effect templates in response to the second operation, wherein the first effect template comprises the first music; and wherein the generating the replacement frames comprises freezing, by the electronic device, a second video frame in the first video data to obtain the replacement frames for replacing the first video frames, wherein the second video frame is a video frame corresponding to the first time point.

5. The method according to claim 4, wherein the first effect template corresponds to a first style; and wherein the determining the first effect template from the plurality of pre-configured effect templates comprises:

determining, by the electronic device by using a pre-configured artificial intelligence model, that the first video data matches the first style; and determining, by the electronic device, the first effect template from an effect template that belongs to the first style; or randomly determining, by the electronic device, the first effect template from the plurality of pre-configured effect templates.

6. The method according to claim 1, wherein:

determining the second transition special effect comprises determining, by the electronic device from a plurality of pre-configured transition special effects, the second transition special effect that has an association identifier with the first music.

7. The method according to claim 1, wherein the second transition special effect is determined from a plurality of pre-configured transition special effects based on matching weights, wherein each of the pre-configured transition special effects corresponds to one of the matching weights, and each matching weight is a quantization ratio parameter of an adaptation degree between the first music and the corresponding pre-configured transition special effect.

8. The method according to claim 1, wherein the second video data further comprises a third transition special effect, the third transition special effect is added to a video frame corresponding to a second time point in the first video data, the third transition special effect is one of a plurality of pre-configured transition special effects, and the plurality of pre-configured transition special effects comprise the second transition special effect.

9. An electronic device, comprising:

one or more processors; and a non-transitory memory, wherein the memory is coupled to the one or more processors, the memory stores computer program code, the computer program code comprises computer instructions, and when the one or more processors execute the computer instructions, the one or more processors are configured to perform:

displaying a first interface, wherein the first interface comprises a first thumbnail of first video data, the first video data comprises a first transition special effect, and the first transition special effect is superimposed on consecutive first video frames in the first video data;

receiving a first operation performed by a user on the first thumbnail;

displaying a second interface in response to the first operation, wherein the second interface is a video editing interface of the first video data, and the second interface comprises a one-click blockbuster control;

generating, automatically and by the electronic device, in response to a second operation performed by the user on the one-click blockbuster control, second video data, wherein generating the second video data comprises:

determining an effect template according to picture content of the first video data;

detecting a mark in the first video data;

deleting at least one marked video frame from the first video data in response to detecting the mark in the first video data, wherein the at least one marked video frame is the consecutive first video frames in the first video data on which the first transition special effect is superimposed, wherein the deleting the marked video frame divides the first video data into a first video clip and a second video clip;

generating replacement frames comprising at least one first replacement frame generated from the first video clip and at least one second replacement frame generated from the second video clip;

determining a second transition special effect according to an adaptation degree between the effect template and the second transition special effect; and generating the second video data by superimposing the second transition special effect on the at least one first replacement frame and the at least one second replacement frame and connecting the first video clip with the second video clip; and displaying a third interface after receiving the second operation performed by the user on the one-click blockbuster control, wherein the third interface is used to display the second video data, the second video data comprises third video frames of the first video data, replacement frames, first music, and wherein the second transition special effect corresponds to the first music.

10. A non-transitory computer storage medium, comprising computer instructions, wherein when the computer instructions are run on an electronic device, the electronic device is enabled to perform:

displaying a first interface, wherein the first interface comprises a first thumbnail of first video data, the first video data comprises a first transition special effect, and the first transition special effect is superimposed on consecutive first video frames in the first video data;

receiving a first operation performed by a user on the first thumbnail;

displaying a second interface in response to receiving the first operation, wherein the second interface is a video editing interface of the first video data, and the second interface comprises a one-click blockbuster control;

generating, automatically and by the electronic device, in response to a second operation performed by the user on the one-click blockbuster control, second video data, wherein generating the second video data comprises:

determining an effect template according to picture content of the first video data;

detecting a mark in the first video data;

deleting at least one marked video frame from the first video data in response to detecting the mark in the first video data, wherein the at least one marked video frame is the consecutive first video frames in the first video data on which the first transition special effect is superimposed, wherein the deleting the marked video frame divides the first video data into a first video clip and a second video clip;

generating replacement frames comprising at least one first replacement frame generated from the first video clip and at least one second replacement frame generated from the second video clip;

determining a second transition special effect according to an adaptation degree between the effect template and the second transition special effect; and generating the second video data by superimposing the second transition special effect on the at least one first replacement frame and the at least one second replacement frame and connecting the first video clip with the second video clip; and displaying, by the electronic device, a third interface after receiving the second operation performed by the user on the one-click blockbuster control, wherein the third interface is used to display the second video data, the second video data comprises third video frames of the first video data, replacement frames, first music, and wherein the second transition special effect corresponds to the first music.

11. The method according to claim 2, further comprising:

displaying, by the electronic device, a lens mode selection window after receiving an operation performed by the user on the second control; wherein the lens mode selection window comprises front/rear mode, rear/rear mode, picture-in-picture mode, single-rear mode, and single-front mode.

12. The method according to claim 11, wherein the front/rear mode is in a selected state, and wherein the fourth operation comprises a selection operation performed by the user on the rear/rear mode, the picture-in-picture mode, the single-rear mode, or the single-front mode.

13. The electronic device according to claim 9, wherein when the one or more processors execute the computer instructions, the one or more processors are configured further to perform:

displaying a fourth interface before the displaying the first interface, wherein the fourth interface is a viewfinder preview interface provided by a camera application, and the fourth interface comprises a first control indicating to enable video shooting;

receiving a third operation performed by the user on the first control;

displaying a fifth interface in response to the third operation, and starting recording the first video data, wherein the fifth interface is a video recording interface in a first lens mode, and the fifth interface comprises a second control indicating to switch a lens mode;

when recording reaches a first time point of the first video data, displaying a sixth interface in response to a fourth operation performed by the user on the second control, and determining a video frame corresponding to the first time point as a first video frame of the first video frames, wherein the sixth interface is a video recording interface in a second lens mode, and the sixth interface comprises a third control indicating to stop shooting;

receiving a fifth operation performed by the user on the third control;

superimposing the first transition special effect on the first video frames; and wherein displaying the first interface comprises:

displaying the first interface in response to the fifth operation, wherein the first interface is also a viewfinder preview interface provided by the camera application.

14. The electronic device according to claim 9, wherein when the one or more processors execute the computer instructions, the one or more processors are configured further to perform:

displaying a main interface before displaying the first interface, wherein the main interface comprises an icon of a gallery application; and receiving a sixth operation performed by the user on the icon of the gallery application; and wherein displaying the first interface comprises:

displaying the first interface in response to the sixth operation, wherein the first interface is an application interface provided by the gallery application.

15. The electronic device according to claim 13, wherein the determining, the first effect template comprises determining the first effect template from a plurality of pre-configured effect templates in response to the second operation and before the displaying the third interface, wherein the first effect template comprises the first music; and wherein the generating the replacement frames comprises freezing a second video frame in the first video data to obtain a first replacement frame for replacing the first video frame, wherein the second video frame is a video frame corresponding to the first time point.

16. The electronic device according to claim 15, wherein the first effect template corresponds to a first style, and determining the first effect template from the plurality of pre-configured effect templates comprises:

determining, using a pre-configured artificial intelligence model, that the first video data matches the first style, and determining the first effect template from an effect template that belongs to the first style; or randomly determining the first effect template from the plurality of pre-configured effect templates.

17. The electronic device according to claim 9, wherein determining the second transition special effect comprises determining, by the electronic device from a plurality of pre-configured transition special effects, the second transition special effect that has an association identifier with the first music, before the displaying the third interface.

18. The electronic device according to claim 9, wherein determining the second transition special effect comprises determining, by the electronic device, the second transition special effect from a plurality of pre-configured transition special effects based on matching weights, wherein each of the pre-configured transition special effects corresponds to one of the matching weights, and each matching weight is a quantization ratio parameter of an adaptation degree between the first music and the pre-configured transition special effect.

19. The electronic device according to claim 13, wherein when the one or more processors execute the computer instructions, the one or more processors are configured further to perform:

displaying a lens mode selection window after receiving an operation performed by the user on the second control; wherein the lens mode selection window comprises a front/rear mode, rear/rear mode, picture-in-picture mode, single-rear mode, and single-front mode.

20. The electronic device according to claim 19, wherein the front/rear mode is in a selected state, wherein the fourth operation comprises a selection operation performed by the user on the rear/rear mode, the picture-in-picture mode, the single-rear mode, or the single-front mode.

* * * * *